(12) United States Patent
Harrold et al.

(10) Patent No.: US 8,345,088 B2
(45) Date of Patent: Jan. 1, 2013

(54) AUTOSTEREOSCOPIC DISPLAY APPARATUS

(75) Inventors: Jonathan Harrold, Warwickshire (GB); Graham John Woodgate, Oxfordshire (GB)

(73) Assignee: AU Optronics Corporation, Hsin-Chu (TW)

( * ) Notice: Subject to any disclaimer, the term of this patent is extended or adjusted under 35 U.S.C. 154(b) by 461 days.

(21) Appl. No.: 12/791,971

(22) Filed: Jun. 2, 2010

(65) Prior Publication Data

US 2010/0309296 A1 Dec. 9, 2010

(30) Foreign Application Priority Data

Jun. 3, 2009 (GB) .................................. 0909577.9

(51) Int. Cl.
*H04N 13/04* (2006.01)
*G02B 26/00* (2006.01)

(52) U.S. Cl. ....... 348/51; 348/54; 348/290; 348/E13.03; 348/E13.022; 348/E13.042; 348/E13.001; 348/E13.026; 359/462

(58) Field of Classification Search .................... 348/51, 348/54, E13.001, E13.026, E13.03, E13.022, 348/E13.042, 290; 359/462
See application file for complete search history.

(56) References Cited

U.S. PATENT DOCUMENTS

| | | | | |
|---|---|---|---|---|
| 3,409,351 | A | | 11/1968 | Winnek |
| 5,712,732 | A | * | 1/1998 | Street ............................. 359/630 |
| 5,861,940 | A | * | 1/1999 | Robinson et al. ............. 351/221 |
| 5,917,562 | A | * | 6/1999 | Woodgate et al. .............. 349/15 |
| 6,046,849 | A | * | 4/2000 | Moseley et al. ................ 359/465 |
| 6,064,424 | A | | 5/2000 | van Berkel et al. |
| 7,058,252 | B2 | | 6/2006 | Woodgate et al. |
| 8,164,598 | B2 | * | 4/2012 | Kimpe ........................... 345/629 |
| 2008/0144174 | A1 | * | 6/2008 | Lucente et al. ................ 359/463 |
| 2008/0170293 | A1 | * | 7/2008 | Lucente et al. ................ 359/463 |
| 2011/0149018 | A1 | * | 6/2011 | Kroll et al. ........................ 348/40 |
| 2011/0227487 | A1 | * | 9/2011 | Nichol et al. .................. 315/158 |
| 2012/0019529 | A1 | * | 1/2012 | Kimpe ........................... 345/419 |
| 2012/0147465 | A1 | * | 6/2012 | Ruhle et al. ................... 359/465 |

FOREIGN PATENT DOCUMENTS

| | | |
|---|---|---|
| WO | WO 03/015424 | 2/2003 |
| WO | WO 2005/006777 | 1/2005 |
| WO | WO 2007/031921 | 3/2007 |

OTHER PUBLICATIONS

Woodgate et al, "Flat Panel Autostereoscopic Displays—Characterisation and Enhancement," Sharp Laboratories of Europe Ltd, Oxford Science Park, printed Oct. 26, 2012.*

* cited by examiner

*Primary Examiner* — Alina N. Boutah
(74) *Attorney, Agent, or Firm* — McClure, Qualey & Rodack, LLP

(57) ABSTRACT

In an autostereoscopic display apparatus comprising a liquid crystal spatial light modulator having an array of pixels of different colors, each pixel comprising plural domains of different polar alignments, and a parallax element comprising an array of optical elements having geometric axes extending in parallel across the spatial light modulator in an inclined direction, the domains are shaped to improve the angular contrast uniformity. For each individual domain, a notional line parallel to the geometric axes of the optical elements of the parallax element has a total length of intersection with the individual domain, summed over adjacent pixels of the same color, is the same for all positions of the notional line. The total length of intersection for different domains is proportional to the area of the individual domains.

20 Claims, 18 Drawing Sheets

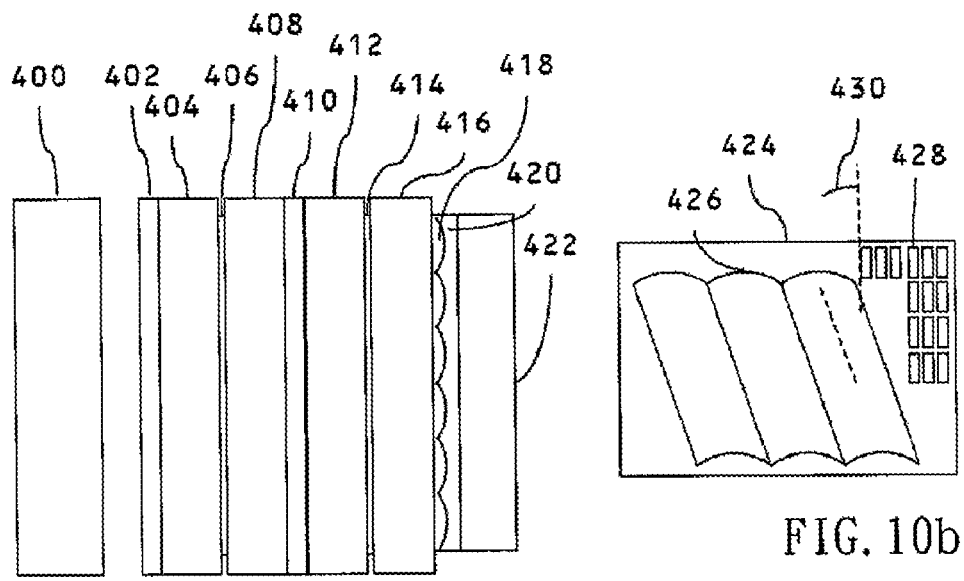
FIG. 10a
FIG. 10b
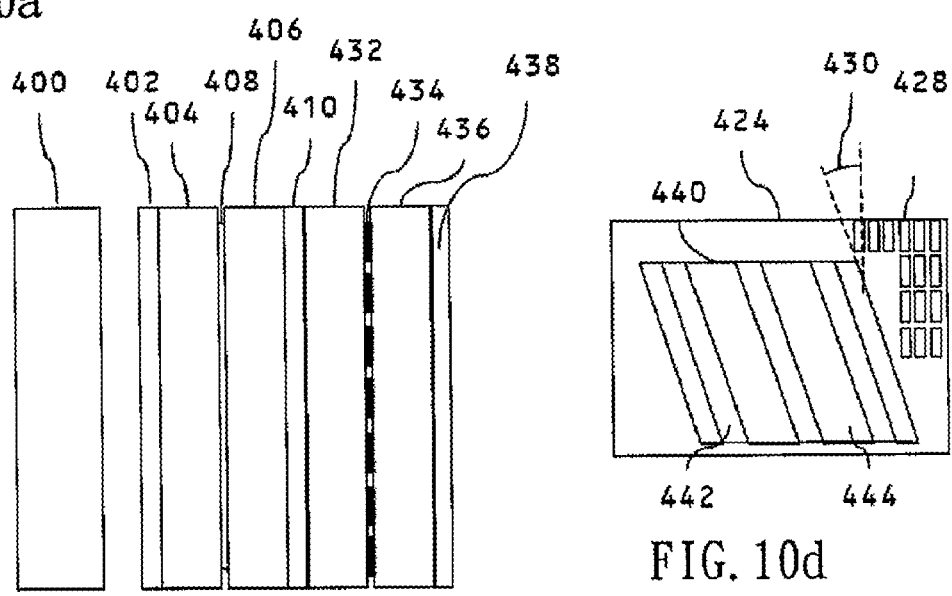
FIG. 10c
FIG. 10d
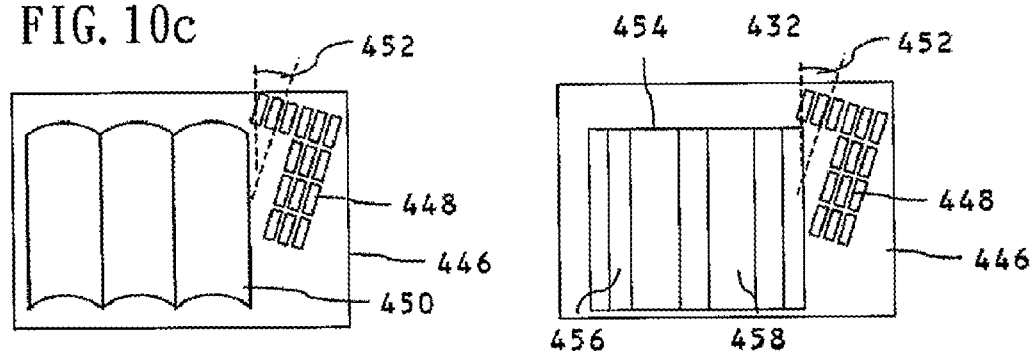
FIG. 10e
FIG. 10f

AUTOSTEREOSCOPIC DISPLAY APPARATUS

RELATED APPLICATIONS

This application claims priority to UK Patent Application Serial Number 0909577.9, filed Jun. 3, 2009, which is herein incorporated by reference.

BACKGROUND

1. Technical Field

The present disclosure relates to pixel structures for an autostereoscopic display apparatus. More particularly, the present disclosure relates to pixel structures for an autostereoscopic display apparatus used in televisions, computer monitors, telecommunications handsets, digital cameras, laptop and desktop computers, games apparatuses, automotive and other mobile display applications.

2. Description of Related Art

Normal human vision is stereoscopic, that is each eye sees a slightly different image of the world. The brain fuses the two images (referred to as the stereo pair) to give the sensation of depth. Three dimensional (3D) stereoscopic displays show a separate image to each of the eyes corresponding to that which would be seen if viewing a real world scene. The brain again fuses the stereo pair to give the appearance of depth in the image.

FIG. 1 shows in plan view a display surface in a display plane 201. A right eye 202 views a right eye homologous image point 203 on the display plane and a left eye 204 views a left eye homologous point 205 on the display plane to produce an apparent image point 206 perceived by the user behind the screen plane. If light from point 203 is seen by the eye 204 and light from the point 205 is seen by the eye 202 then a pseudoscopic image point 210 is produced. Pseudoscopic images are undesirable as they produce visual strain to observers.

FIG. 2 shows in plan view a display surface in a display plane 201. A right eye 202 views a right eye homologous image point 207 on the display plane and a left eye 204 views a left eye homologous point 208 on the display plane to produce an apparent image point 209 in front of the screen plane. Pseudoscopic image point 212 is produced if the eye 202 can see light from point 208 and the eye 204 can see light from point 207.

FIG. 3 shows the appearance of the left eye image 10 and right eye image 11. The homologous point 205 in the left eye image 10 is positioned on a reference line 12. The corresponding homologous point 203 in the right eye image 11 is at a different relative position 203 with respect to the reference line 12. The separation 13 of the point 203 from the reference line 12 is called the disparity and in this case is a positive disparity for points which will lie behind the screen plane. Similarly in the left eye image 10, the homologous point 208 is positioned on a reference line 14 while in the right eye image the corresponding homologous point 207 is laterally separated from the reference line 14 by a distance 15 with a negative disparity. Changing from the left eye image 10 to the right eye image 11 as shown in FIGS. 1 to 3, the movement of the homologous point 203 is to the right. This corresponds to an apparent image point 206 behind the screen plane, while the movement of the homologous point 207 is to the left, corresponding to an apparent image point 209 in front of the screen plane.

For a generalized point in the scene there is a corresponding point in each image of the stereo pair as shown in FIG. 3. These points are termed the homologous points. The relative separation of the homologous points between the two images is termed the disparity; points with zero disparity correspond to points at the depth plane of the display. FIG. 1 shows that points with uncrossed disparity appear behind the display and FIG. 2 shows that points with crossed disparity appear in front of the display. The magnitude of the separation of the homologous points, the distance to the observer, and the observer's interocular separation gives the amount of depth perceived on the display.

Stereoscopic type displays are well known in the prior art and refer to displays in which some kind of viewing aid is worn by the user to substantially separate the views sent to the left and right eyes. For example, the viewing aid may be color filters in which the images are color coded (e.g. red and green); polarizing glasses in which the images are encoded in orthogonal polarization states; or shutter glasses in which the views are encoded as a temporal sequence of images in synchronization with the opening of the shutters of the glasses.

Autostereoscopic displays operate without viewing aids worn by the observer. In autostereoscopic displays, each of the views can be seen from a limited region in space as illustrated in FIG. 4.

FIG. 4 shows a display device 16 with an attached parallax element 17. The display device 16 produces a right eye image 18 for the right eye channel. The parallax element 17 directs light in a direction shown by the arrow 19 to produce a right eye viewing window 20 in the region in front of the display. An observer places their right eye 22 at the position of the window 20. The position of the left eye viewing window 24 is shown for reference. The viewing window 20 may also be referred to as a vertically extended optical pupil.

FIG. 5 shows the left eye optical system. The display device 16 produces a left eye image 26 for the left eye channel. The parallax element 17 directs light in a direction shown by the arrow 28 to produce a left eye viewing window 30 in the region in front of the display. An observer places their left eye 32 at the position of the window 30. The position of the right eye viewing window 20 is shown for reference.

The parallax element 17 acts as an optical steering mechanism. The light from the left image 26 is sent to a limited region in front of the display, referred to as the viewing window 30. If an eye 32 is placed at the position of the viewing window 30 then the observer sees the appropriate image 26 across the whole of the display 16. Similarly the optical system sends the light intended for the right image 18 to a separate window 20. If the observer places their right eye 22 in that window then the right eye image will be seen across the whole of the display. Generally, the light from either image may be considered to have been optically steered (i.e. directed) into a respective directional distribution.

In this application the term "3D" is used to refer to a stereoscopic or autostereoscopic image in which different images are presented to each eye resulting in the sensation of depth being created in the brain. This should be understood to be distinct from "3D graphics" in which a 3D object is rendered on a two dimensional (2D) display device and each eye sees the exact same image.

The parallax element 17 may be switchable between a state in which it provides a 3D image and a state in which it has substantially no optical effect to allow selective display of 3D and 2D images. In this application the term "2D/3D" is used to refer to a display apparatus in which the function of the optical element can be so switched to enable a full resolution 2D image or a reduced resolution autostereoscopic 3D image.

FIG. 6 shows in plan view a display apparatus comprising a display device 16 and parallax element 17 in a display plane 34 producing the left eye viewing windows 36, 37, 38 and right eye viewing windows 39, 40, 41 in the window plane 42. The separation of the window plane from the display is termed the nominal viewing distance 43. The windows 37, 40 in the central position with respect to the display are in the zeroth lobe 44. Windows 36, 39 to the right of the zeroth lobe 44 are in the +1 lobe 46, while windows 38, 41 to the left of the zeroth lobe are in the −1 lobe 48.

The viewing window plane 42 of the display represents the distance from the display at which the lateral viewing freedom is greatest. For points away from the window plane, there is a diamond shaped autostereoscopic viewing zone, as illustrated in plan view in FIG. 6. As can be seen, the light from each of the points across the display is beamed in a cone of finite width to the viewing windows. The width of the cone may be defined as the angular width.

The parallax element 17 serves to generate a directional distribution of the illumination at the window plane 42 at a defined distance 43 from the display device 16. The variation in intensity across the window plane 42 constitutes one tangible form of a directional distribution of the light.

If an eye is placed in each of a pair viewing zones such as 37, 40 then an autostereoscopic image will be seen across the whole area of the display. To a first order, the longitudinal viewing freedom of the display is determined by the length of these viewing zones.

The variation in intensity 50 across the window plane of a display (constituting one tangible form of a directional distribution of the light) is shown with respect to position 51 for idealised windows in FIG. 7. The right eye window position intensity (or luminance) distribution 52 corresponds to the window 41 in FIG. 6, and intensity distribution 53 corresponds to the window 37, intensity distribution 54 corresponds to the window 40 and intensity distribution 55 corresponds to the window 36. The integrated intensity distribution 60 is the sum of the intensity of the individual windows 52, 53, 54, 55 and further adjacent windows.

FIG. 8 shows the intensity distribution with position schematically for more realistic windows. The right eye window position intensity distribution 56 corresponds to the window 41 in FIG. 6, and intensity distribution 57 corresponds to the window 37, intensity distribution 58 corresponds to the window 40 and intensity distribution 59 corresponds to the window 36. The ratio of the variation from a nominal intensity distribution of the distribution 60 to the nominal intensity in an angular range is termed the angular intensity uniformity (AIU). The nominal intensity distribution may be for example a flat Luminance distribution as shown in FIG. 7, a Lambertian distribution, or some other distribution with a substantially smoothly varying intensity profile. The AIU may be measured over a limited range of viewing angles, or over the entire angular range of output angles of the respective display.

FIG. 9 shows a further intensity distribution in which substantially triangular shaped windows 61 are overlapped in order to produce a flat distribution 60. Advantageously, such windows can provide a robust means by which to reduce fluctuations in the distribution 60. Further such windows reduce image flipping artefacts in which the image content appears to rapidly change from one view to another, causing an apparent rotation of the image to an observer.

Several 3D artefacts can occur due to inadequate window performance, particularly for overlapping windows. Pseudoscopic images occur when light from the right eye image is seen by the left eye and vice versa. This is a significant 3D image degradation mechanism that can lead to visual strain for the user. Overlapping windows are seen as image blur, which limits the useful amount of depth that can be shown by the display. Additionally, poor window quality will lead to a reduction in the viewing freedom of the observer. The optical system is designed to optimize the performance of the viewing windows.

In displays with multiple views, adjacent windows contain a series of view data. As an observer moves laterally with respect to the display, the images seen by each eye vary so that the appearance of a 3D image is maintained. Human observers are sensitive to variation in luminance as they move with respect to the display. For example, if the distribution 60 varies by more than 0.5%-5% of the total, then the display will appear to flicker. Thus it is desirable to minimize the variation of the distribution 60. As the distribution varies with the viewing angle, the uniformity of the distribution may be referred to as the angular intensity uniformity (AIU) which is an important performance parameter.

The respective images are displayed at the display plane 34, and observed by an observer at or near the window plane 42. The variation in intensity across the window plane 42 is not defined by the variation in intensity across the image. However, the image seen by an observer at the window plane 42 may be referred to as the image at the viewing window for ease of explanation.

There will now be discussed some known techniques for improving the AIU of a display.

One type of prior art pixel configuration for autostereoscopic display apparatus uses the well known stripe configuration as shown in FIG. 11a as used for standard 2D displays. The pixels apertures 62 are arranged in columns of red pixels 65, green pixels 67 and blue pixels 69. To generate an autostereoscopic display, a parallax element 63 such as a lenticular array is aligned with groups of color pixels 65, 67 and 69 as shown. The cusp 71 between the lenses of the array is one example of the geometric axis of the array of parallax elements.

The parallax element 63 may be slanted so that the geometric axes of the optical elements (e.g. lenses in the case of a lenticular array) of the parallax element 63 are inclined to the vertical column direction of the pixel apertures 62, as described for example in U.S. Pat. No. 3,409,351 and U.S. Pat. No. 6,064,424. Such an arrangement enables overlapping of windows, similar to that shown in FIG. 9, that results in a better uniformity of the distribution 60 of intensity compared to a parallax element 63 in which the geometric axes of the optical elements are parallel to the vertical column direction of the pixel apertures 62.

Herein a line parallel to the geometric axes of the optical elements of a parallax element is termed a "ray line" (being a line along which rays of light are nominally (ignoring aberrations) directed from a display device to the same relative horizontal position in the window plane at any one vertical position in the window plane, rather than being the direction of a ray of light). FIG. 11a further shows the inclined orientation of the ray lines 64 and the geometric axes of the optical elements of the parallax element 63 with respect to the pixel apertures 62. Such an arrangement will generate windows that are tilted with respect to the vertical such that the view data will appear to change as the observer moves vertically.

FIG. 11a further includes a graph of the resultant intensity 50 at horizontal positions 51 in the viewing (window) plane for an ideal lens with an idealized focused spot. For ease of understanding, the positions where a ray line 64 crosses the distribution 60 correspond to horizontal position 51 into which light is directed from the ray line 64. The intensity 50 has an intensity which is generally flat but which has peaks 74 whose origin has been appreciated as follows.

The intensity distribution at each given position 51 can be determined by measuring the total intersection length 66, 68, 70, 72 of the ray lines 64 corresponding to that position 51 with the aperture across adjacent pixel apertures 62. This is because, in operation, the parallax element 63 collects light from a ray line 64 and directs it all towards a position in space where that light is observed by the viewer (in fact an eye receives light from a bundle of ray lines 64 due to the pupil size, lens aberrations and lens focus condition so the actual intensity observed is a convolution of the intensity distribution 60 but this will still have similar peaks). Thus as the intensity 50 varies, the total intersection length varies due to the ray line 64 varyingly covering different amounts of the pixel apertures 62 and the gaps therebetween. In particular, the distribution 60 includes elevated levels where the total intersection length is high because the ray line 64 intersects more of the pixel apertures 62 in the corner thereof.

As can be seen, the total intersection length 66, 68, 70, 72 can include contributions from two adjacent pixel apertures 62. While these adjacent pixels have two different colors, each will have a corresponding pixel of the same color in the unit cell structure of the 3D image. So, the adjacent pixels can conveniently be used to form an understanding of the total intersection length within a single color.

In some known systems with non-uniform distribution 60 where the parallax element 63 is a lenticular array, the lenses may be defocussed in order to smooth the distribution 60, effectively by providing an average of the different intersection lengths 66 of different ray lines 64. However, such an approach creates an increased overlap between the 3D windows and results in increased levels of image blur, reduced useful depth and increased pseudoscopic images. It is desirable to maintain a high AIU without increasing the defocus of the lenses.

WO-2007/031921 discloses a technique by which the increases in the distribution 60 are reduced by means of a pixel cut-out 76 as shown in FIG. 11b. (As an aside, similar considerations apply in the teachings of WO 2005/006777 which describes pixel arrangements in which the pixel shape is modified so as to provide improved uniformity in displays in which the optical elements are aligned parallel to the pixel columns.) The cut-out 76 compensates for the increased intersection which otherwise occurs in the corner of the pixel aperture 62 reducing the total intersection length for those ray lines 64 and thereby flattening the intensity distribution 60. However, such an arrangement cannot be used to compensate the output of wide viewing angle displays, as will be shown below.

Conventional Liquid Crystal Display (LCD) panels such as twisted nematic Liquid Crystal (LC) with homogeneous alignment use substantially rectangular pixel aperture shapes in which the whole of the pixel operates as a single domain such that the angular contrast properties of the optical output are substantially constant for each part of the pixel. Such pixels are well suited to the rectangular cutout approach to improve uniformity of distribution 60. However, such panels suffer from significant variations of contrast with viewing angle freedom due to the restrictions of the optical performance of a single liquid crystal alignment domain within the cell. In order to compensate for such viewing angle effects, one approach is to use Vertical Aligned (VA) LC materials in combination with multiple domain structures and further complex alignment modification techniques. In this case each pixel comprises plural domains having different alignments of the liquid crystal molecules in each domain. The contrast viewing angle properties of the display are determined by the addition of contrast properties from the individual domains.

The appearance of the output illumination function from such pixels is shown in FIGS. 12a to 12b. FIG. 12a shows that the individually addressable red pixels 82, green pixels 84 and blue pixels 86 typically comprise top and bottom sub-pixels 88, 90 with transmitting apertures 92 and 94 respectively. Within the sub-pixels 88, 90, the transmitting aperture is divided into a first group of domains 1, 2, 3, 4 for the top sub-pixel and a second group of domains 5, 6, 7, 8 for the bottom sub-pixel. The sub-pixels 88, 90 are separated by regions 98, 100 containing electrodes, capacitors and other addressing circuitry. The upper and lower sub-pixels 88, 90 may be addressable unitarily or may be addressable separately.

FIG. 12b illustrates in more detail the domain structure of the sub-pixels 88, 90 by showing the relative location of each of the domains 1-8 within the top sub-pixels 88 and bottom sub-pixels 90. Each of the domains 1-8 contributes to optimum viewing contrast properties in a certain quadrant of the output of the display. Some of the domains such as 3, 4 occupy more than one portion of sub-pixel 88 and 7, 8 occupy more than one portion of sub-pixel 90. Domains 1, 2, 5, 6 are termed as 'main domains' while domains 3, 4, 7, 8 are termed as 'sub-domains'. The contribution of each of the domains 1-8 to the total output is defined by the active area of the domain. The relative contributions of each domain may be adjusted to improve the angular contrast uniformity, for example to improve image washout performance at high angles. For example, the main domains 1, 2, 5 and 6 may have the same area and the sub domains 3, 4, 7 and 8 may have the same area greater than the area of the main domains 1, 2, 5 and 6. The ratio of the area of a main domain to the area of a sub domain is termed as the domain area ratio and for example may be between 3:7 and 1:1, and typically 9:11.

Applying the cut-out method to the individually addressable display elements in which the aperture is the shape remaining from a rectangular footprint when one or more cut-outs is removed will not produce the required uniformity with viewing angle, for example, as is illustrated in FIGS. 13a and 13b. FIG. 13a shows the alignment of ray line 64 with VA pixel structure of FIG. 12. As described previously, such an arrangement would provide non-uniform output intensity because of variation in the total intersection length of different ray-lines with position across the pixel width. FIG. 13b shows the introduction of cut-outs 102, 103 into the individually addressable pixel apertures.

It has been appreciated that, although such an arrangement might be expected to provide some improvement to uniformity, it will not produce high uniformity in a VA LC display device wherein the domains are required to operate uniformly in order to maintain the contrast properties across different viewing angles of the display apparatus. As the uniformity of each of the domains 1-8 is not controlled, there will be variation in the contrast with angle. This property of the uniformity of the contrast with viewing angle may be termed the angular contrast uniformity (ACU). The non-uniformity is illustrated in FIG. 14 showing how the distribution 60 for an individual domain 1 suffers from AIU degradation, this resulting in ACU degradation for the display apparatus as a whole. In particular the intersection length 104 of a ray line 64 with the domain 1 produces a flat region 106 in the AIU distribution 60 across much of the domain, but the region 108 of the domain 1 aperture will produce a defect 110 in the AIU distribution 60. This means that while the integrated intensity of the pixel as a whole may be uniform by aperture considerations alone, the domain 1 uniformity will not be constant with the consequence that the display apparatus will appear to vary in intensity, particularly in the quadrant for which domain 1 has a dominant contrast effect on the final image quality.

Thus, the use of cut-outs in the pixel aperture does not deal with maintenance of ACU in display apparatuses having multiple domains, for example wide viewing freedom displays such as VA displays, because the AIU of individual domains is not considered.

SUMMARY

According to the present invention there is provided an autostereoscopic display apparatus comprising:

a spatial light modulator having an array of individually addressable pixels of different colors arranged with a repeating unit of pixels which repeats in a row direction and in a column direction, each pixel comprising plural domains; and a parallax element comprising an array of optical elements arranged over the spatial light modulator to direct light from pixels into different viewing windows, the optical elements having geometric axes extending in parallel across the spatial light modulator in a direction inclined at an angle with respect to the column direction, wherein the domains are shaped such that, for each individual domain, a notional line parallel to the geometric axes of the optical elements of the parallax element has a total length of intersection with the individual domain, summed over pixels of the same color which are adjacent along the notional line, which is the same for all positions of the notional line, said total length of intersection for different domains being proportional to the area of the individual domains.

This improves the ACU of the display apparatus in the following manner. Firstly, as a result of the total length of intersection of notional lines parallel to the geometric axes of the cylindrical lenses with each individual domain, and summed over pixels of the same color which are adjacent along the notional line, being the same for all positions of the notional line, the AIU of each individual domain is improved. Secondly, and in combination therewith, as that total length of intersection for different domains is proportional to the area of the individual domains, the ACU for different viewing angles is improved. In addition, these advantages may be achieved without the need to defocus the optical elements, allowing the focus of the parallax optic to be set to provide a small image at the pixel plane so as to reduce blurring between viewing windows. Advantageously this improves 3D image quality by reducing the intensity of pseudoscopic images and reduces the blur of images.

This improvement of ACU improves the performance of the display apparatus. It may provide various advantages depending on the configuration of the display apparatus. Such advantages include, for example reducing image blur, and/or allowing increased levels of depth to be shown. The invention has particular value in an autostereoscopic multiview display apparatus in enabling the display apparatus to be free of visible flicker for a moving observer. Thus an observer moving with respect to the display will not see the display appear to flicker as they move, or see intensity changes across the display area.

In a switchable 2D/3D display apparatus, besides such advantages in the 3D mode, the AIU and ACU in the 2D mode may also be improved and the manufacturing and design of switchable parallax element may be relaxed having the results of lower cost, higher yield and/or relaxed tolerances. In a switchable 2D/3D display apparatus, using a birefringent lens array as the parallax element, the index matching requirement of the lens array may be relaxed and/or the polarization switcher performance at high angles may be relaxed.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows:

FIG. 10a shows a switchable lenticular display;

FIG. 10b shows an arrangement of spatial light modulator and lenticular array;

FIG. 10c shows a switchable parallax barrier display;

FIG. 10d shows an arrangement of spatial light modulator and parallax barrier;

FIG. 10e shows an arrangement of spatial light modulator and lenticular array;

FIG. 10f shows an arrangement of spatial light modulator and parallax barrier;

FIG. 12b shows the domain structure of FIG. 12a;

FIG. 13a shows the alignment of a ray line with the pixel structure of FIG. 12a;

FIG. 13b shows the arrangement of FIG. 13a with an additional pixel cut-out;

FIG. 17 shows a detail of the top sub-pixel of FIG. 16a;

FIG. 18 shows a detail of the bottom sub-pixel of FIG. 16a;

FIG. 19 shows a modified domain structure embodiment to provide a uniform intensity and contrast distribution for a different ray line angle to FIG. 16a;

FIG. 22a shows a first domain arrangement for a bottom sub-pixel of FIG. 21a;

FIG. 22b shows a second domain arrangement for a bottom sub-pixel of FIG. 21a;

DESCRIPTION OF THE EMBODIMENTS

Figure 1:
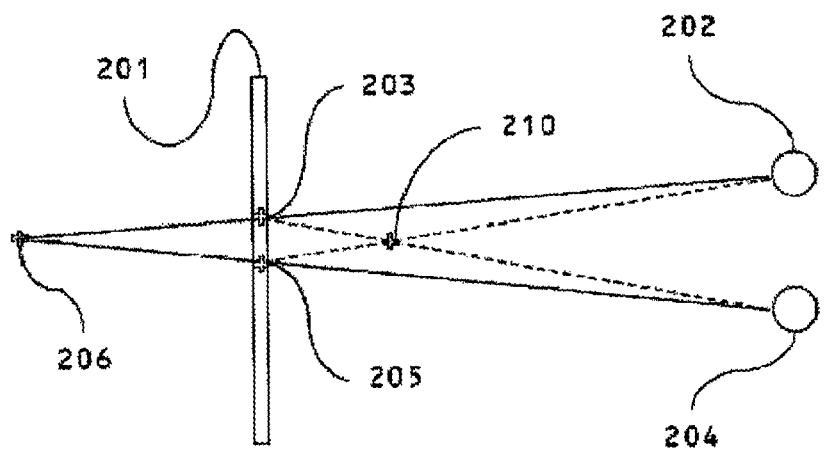
FIG. 1 shows the generation of apparent depth in a 3D display for an object behind the screen plane.
Figure 2:
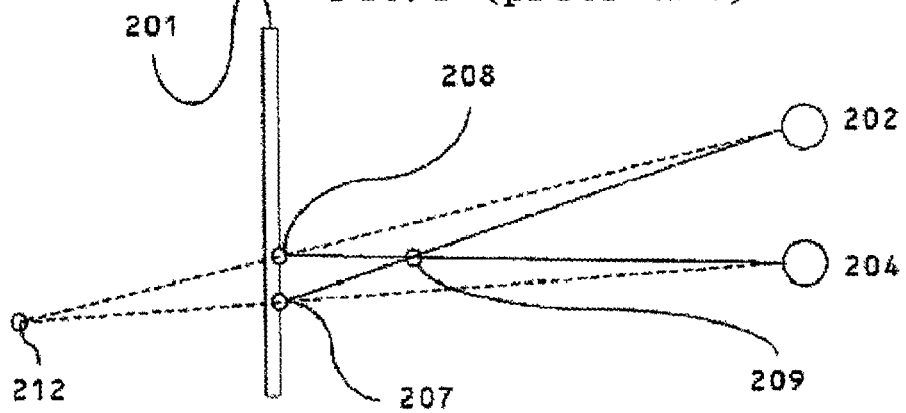
FIG. 2 shows the generation of apparent depth in a 3D display for an object in front of the screen plane.
Figure 3:
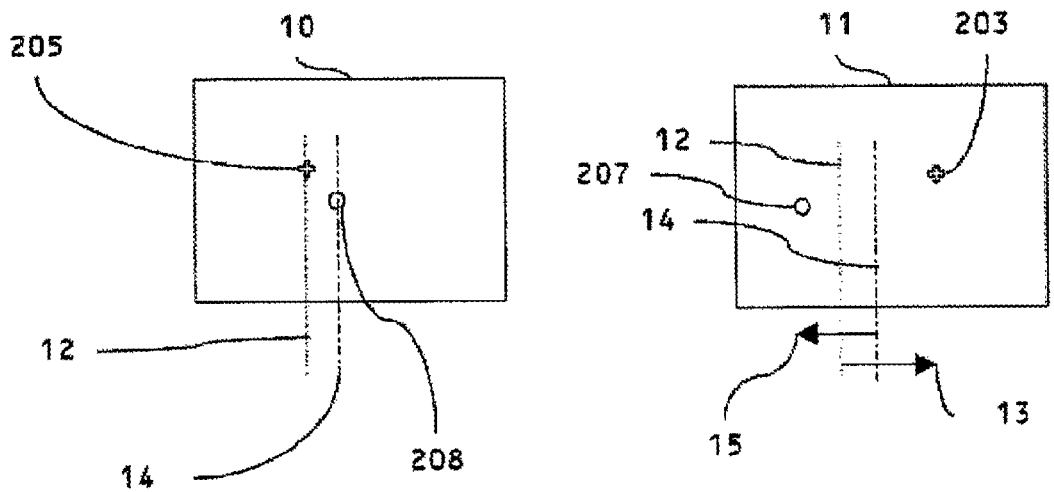
FIG. 3 shows the position of the corresponding homologous points on each image of a stereo pair of images.
Figure 4:
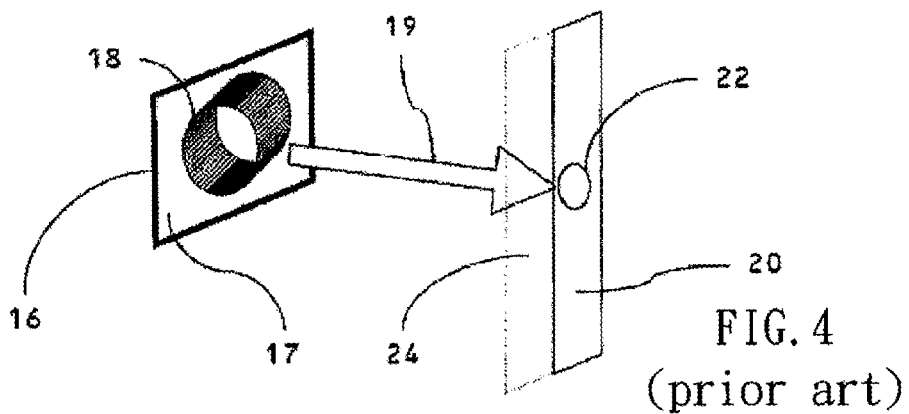
FIG. 4 shows schematically the formation of the right eye viewing window in front of an autostereoscopic 3D display.
Figure 5:
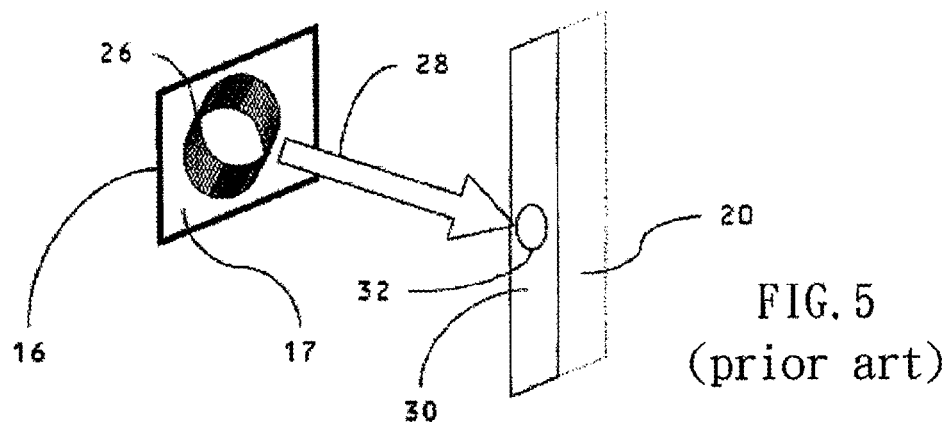
FIG. 5 shows schematically the formation of the left eye viewing window in front of an autostereoscopic 3D display.
Figure 6:
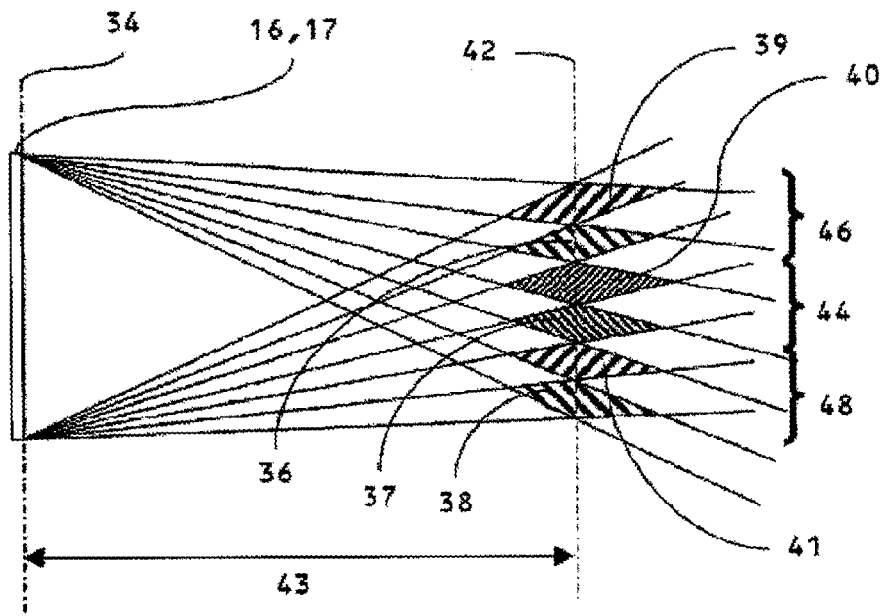
FIG. 6 shows in plan view the generation of viewing zones from the output cones of a 3D display.
Figure 7:
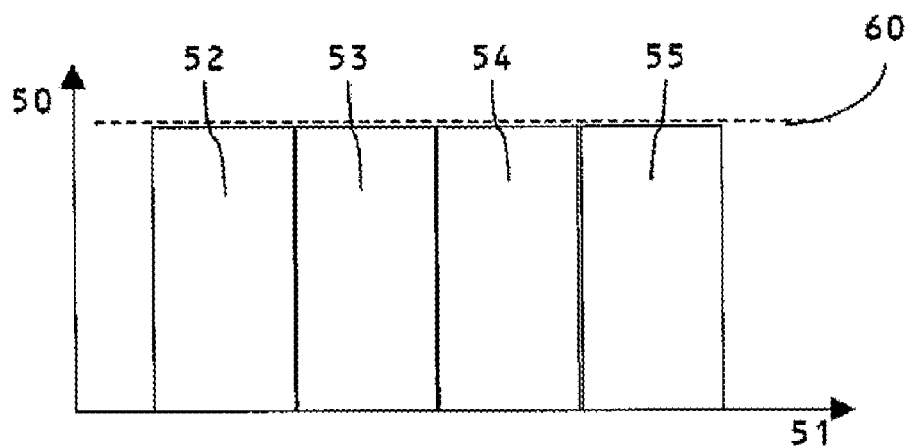
FIG. 7 shows one window profile for an autostereoscopic display.
Figure 8:
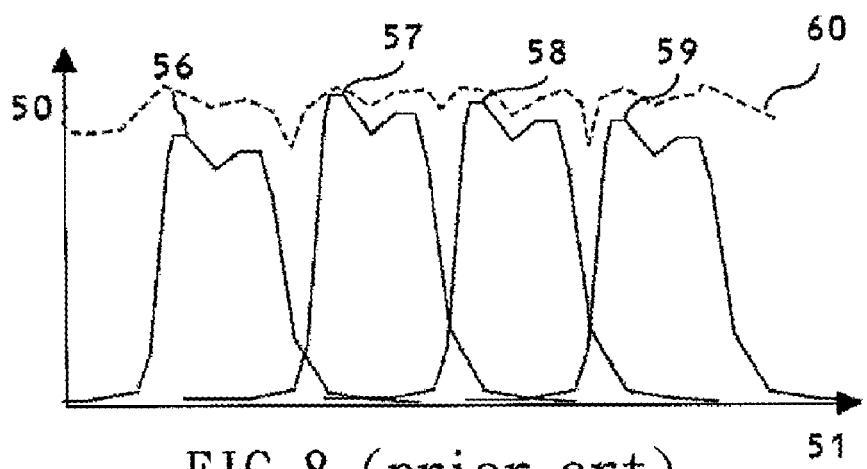
FIG. 8 shows a schematic of the output profile of viewing windows from an autostereoscopic 3D display.

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

The terms used in this specification generally have their ordinary meanings in the art and in the specific context where each term is used. The use of examples anywhere in this specification, including examples of any terms discussed herein, is illustrative only, and in no way limits the scope and meaning of the invention or of any exemplified term. Likewise, the present invention is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present invention. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

FIG. 10a shows in schematic side view of a known autostereoscopic display apparatus described in WO-03/015424 comprising a switchable lenticular element. A backlight 400 illuminates a spatial light modulator comprising a transmissive liquid crystal display, further comprising a polarizer 402, substrate 404, pixellated liquid crystal layer 406, substrate 408, polarizer 410, substrate 412, switchable polarization rotating layer 414, substrate 416, birefringent microlens array 418 (comprising one embodiment of a lenticular screen), isotropic layer 420 and substrate 422. Such a 2D/3D display is capable of switching between an autostereoscopic 3D display and a full resolution 2D display with full brightness in 2D and 3D modes.

As shown schematically in plan view in FIG. 10b, such a display comprises slanted elongate lenticular elements 426 arranged over and aligned to a spatial light modulator 424 comprising an array of pixels 428 at an angle 430. The individually addressable pixels 428 are of different colors and are arranged with a repeating unit of pixels which repeats in a horizontal row direction and in a vertical column direction. The lenticular elements 426 have geometric axes extending in parallel across the spatial light modulator in a direction inclined at an angle with respect to the column direction which in this case is the vertical direction.

A lenticular screen may comprise an array of vertically extended cylindrical microlenses. The term "cylindrical" as used herein has its normal meaning in the art and includes not only strictly spherical lens shapes but also aspherical lens shapes. The pitch of the lenses again corresponds to the viewpoint correction condition so as to provide viewing windows at the correct viewing distance. The curvature of the lenses is set substantially so as to produce an image of the LCD pixels at the window plane. As the lenses collect the light in a cone from the pixel and distribute it to the windows, lenticular displays have the full brightness of the base panel.

A cylindrical lens describes a lens in which an edge (which has a radius of curvature) is swept in a first linear direction. The geometric axis of the cylindrical lens is defined as the line along the center of the lens in the first linear direction, i.e. parallel to the direction of sweep of the edge.

FIG. 10c shows an equivalent parallax barrier to the display of FIG. 10a. The output of the polarizer 410 has a substrate 432, a patterned switchable liquid crystal layer 434, a substrate 436 and output polarizer 438. Such a known display is capable of providing a switchable 2D/3D parallax barrier display in which the parallax barrier elements are formed in the layer 434 comprising phase regions in the pattern of a barrier with gap and barrier regions when analyzed by polarizers 410, 438. The switchable parallax barrier may alternatively be located between the backlight 400 and the polarizer 402.

Figure 9:
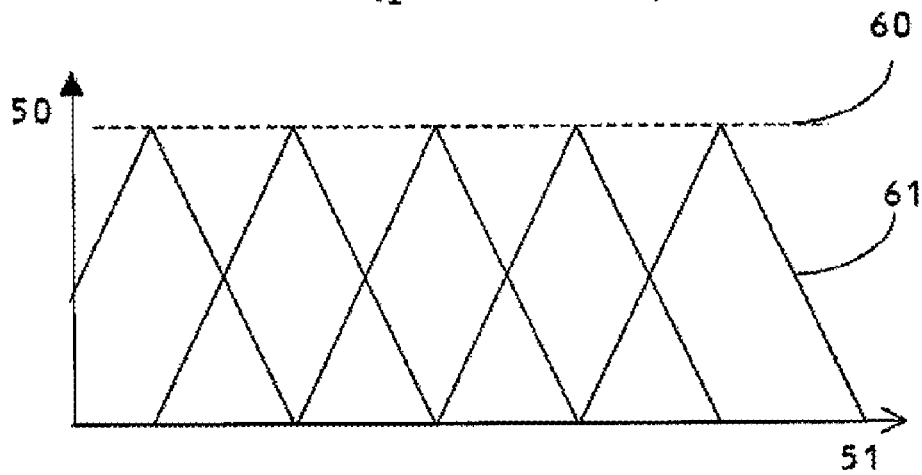
FIG. 9 shows another schematic of the output profile of viewing windows from an autostereoscopic 3D display.

FIG. 10d shows the equivalent alignment of the barrier with the array of pixels 428. The barrier 440 comprises barrier regions 444 and aperture regions 442, wherein the barrier regions 444 are elongate and aligned at angle 430 with respect to the array of pixels 428. The arrangement of FIG. 10b and FIG. 10d advantageously enable the windows of FIG. 9 to be produced with a standard panel pixel arrangement, but suffer from inclination of the viewing windows such that the optimum viewing position shifts laterally as the observer moves vertically.

As shown in FIG. 10e, alternatively the lenticular elements 450 of FIG. 10b can be aligned vertically while the array of pixels 448 of the spatial light modulator 446 is aligned at an angle 452, i.e. the column direction is inclined with respect to the vertical direction. Similarly, as shown in FIG. 10f, the barrier 454 comprising aperture regions 456 and barrier regions 458 can be aligned vertically while the pixels 448 of the array are inclined at an angle 452. The arrangements of FIGS. 10e and 10f advantageously produce vertical viewing windows so that the optimum viewing position does not appear to change as the viewer moves vertically with respect to the display.

Alternatively, arrangements can be incorporated in which both the array of pixels and array of parallax elements are inclined to the vertical.

In this specification, the geometric axis of a parallax element such as a lenticular screen or parallax barrier is the axis parallel to the extent of the optical element. The geometric axis of a lenticular screen is thus the axis parallel to the cusps and the edge of each cylindrical lenslet while the geometric axis of a parallax barrier is the line parallel to the edge of each aperture. The array of parallax element comprises multiple geometric axes which extend in parallel across the spatial light modulator. As shown in FIGS. 10b, 10d, 10e and 10f, the parallax elements are inclined at an angle with respect to the column direction of the repeating unit of individually addressable pixels of different colors.

The spatial light modulator of the present embodiments may be transmissive, reflective, transflective or emissive type spatial light modulators wherein the individually addressable elements comprise domains arranged to provide enhanced display properties. The term "SLM" (Spatial Light Modulator) is used to include devices which modulate the transmitted or reflected intensity of an external light source, examples of which include Liquid Crystal Displays. The term SLM also refers to devices which generate light themselves examples of which include Electroluminescent displays.

Figure 11A:
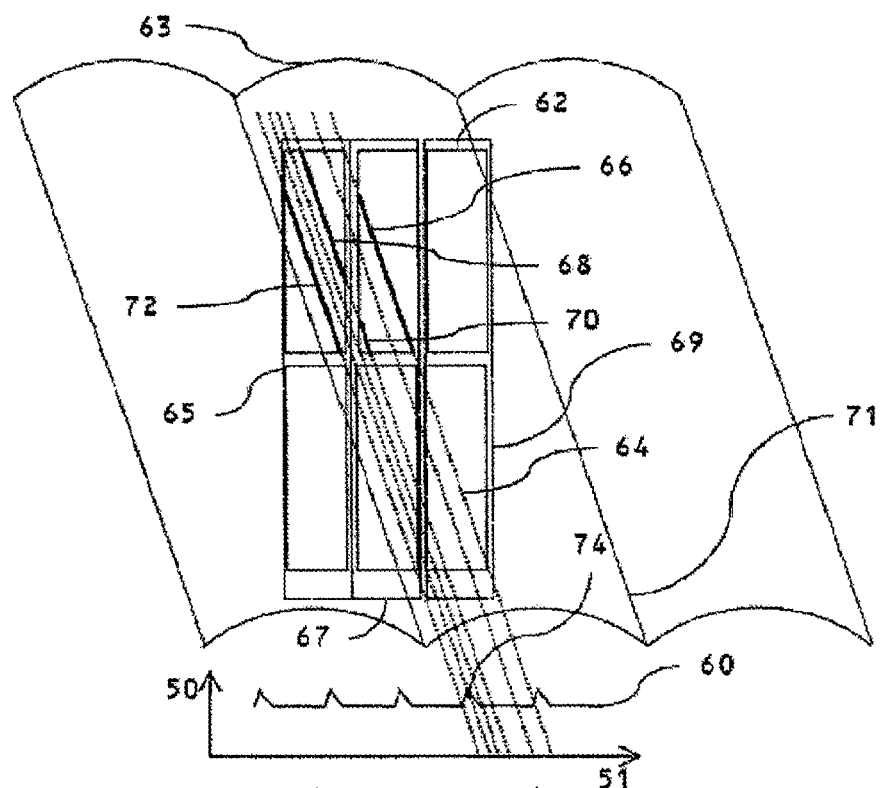
FIG. 11a shows a prior art pixel arrangement and angular intensity distribution.
Figure 11B:
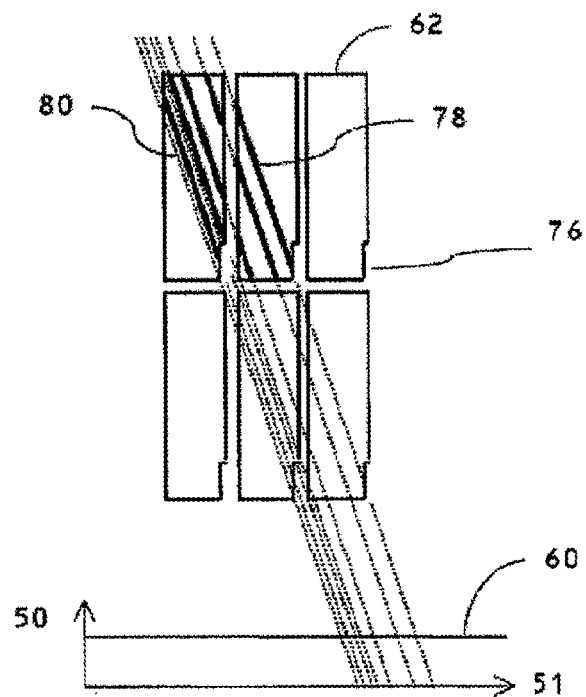
FIG. 11b shows a prior art pixel arrangement and angular intensity distribution.
Figure 11C:
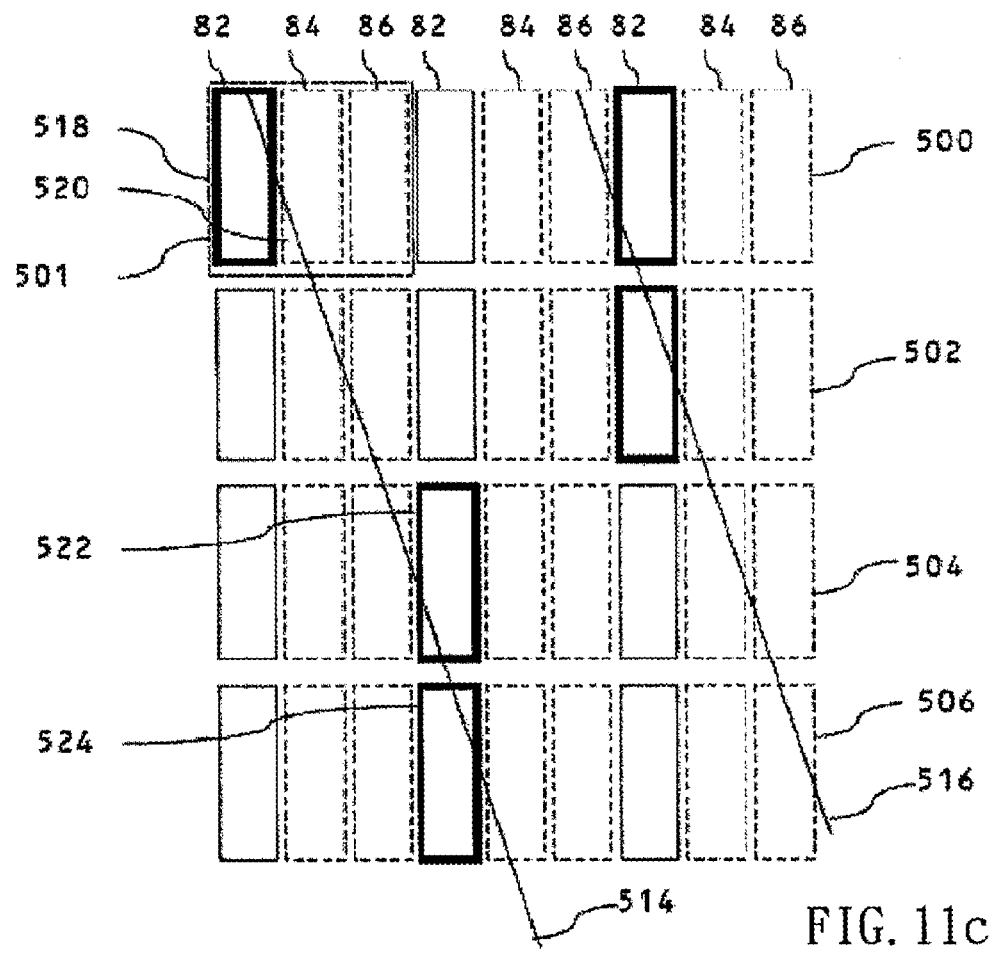
FIG. 11c shows the intersection of a notional ray line with an array of pixels.

FIG. 11c describes a unit cell structure in more detail. An array of individually addressable pixels of different colors comprising columns of red 82, green 84 and blue 86 pixels arranged with a repeating unit 501 of pixels which repeats in a row direction and a column direction is shown and arranged in rows 500, 502, 504, 506, 508 and 510. In this example, the view display with 5 pixels having same color is shown so that ray lines 514 and 516 for adjacent 3D pixels are arranged at an angle of 1 horizontal pixel pitch to 1 vertical pixel pitch. The ray line 514 intersects red pixels 518, 522 and 524. The amount of red light seen in the 3D pixel is determined by the total length of intersection with the pixel, summed over adjacent pixels of the same color along the ray line 514. Thus the intensity in this region of the display is the summation of the intersection length of the line 514 with pixels 518, 522 and 524. In this particular example, the summation is over three adjacent pixels 518, 522 and 524, although in general it may be over different numbers of pixels for different pixel arrangements and ray lines of different angles. It is noted that the alignment means that the intersection length of the ray line 514 with the pixel 524 is the same as that for the pixel 518. Further, the intersection length of the ray line 514 with the red pixel 522 is the same as the intersection length of the ray line 514 with the green pixel 520. Thus, although in operation in a single color, the intersection length is determined over the unit cell comprising pixels 518, 522, the structure of the individual pixels can be determined using adjacent pixels of different colors 518, 520. Such an analysis is used below for convenience, based on the assumption that the shapes of the individually addressable pixel apertures are substantially identical across the spatial light modulator.

In these examples, the repeating unit 501 of pixels repeats in a row direction and a column direction which are perpendicular, although in the general case this is not essential and the row direction and column direction may be arranged at an angle of less than 90 degrees.

Figure 12C:
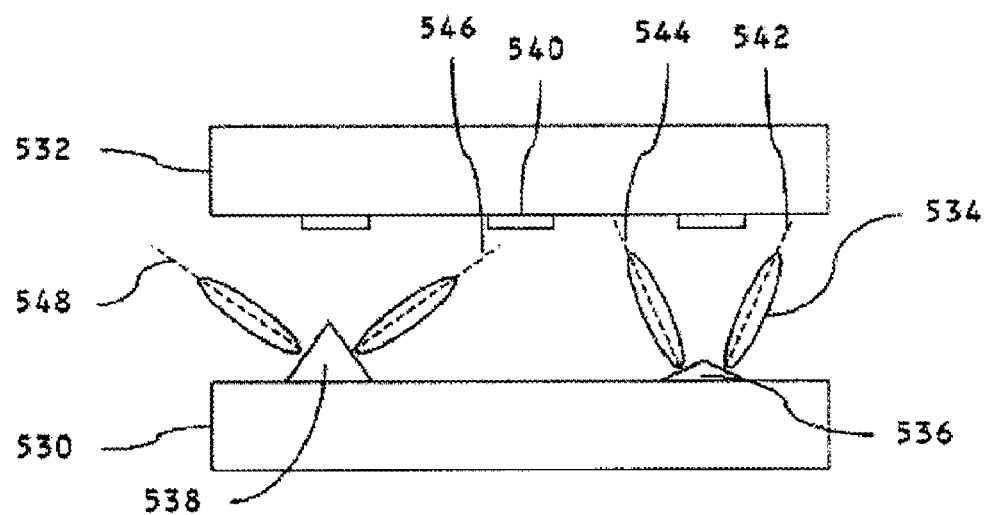
FIG. 12c shows an example of alignment of liquid crystal molecules.

The pixels of the present invention comprise a domain structure in order to achieve the desired optical output from the display. One illustrative example of a liquid crystal pixel with a domain structure is a vertically aligned (VA) liquid crystal pixel and is illustrated in FIG. 12c. A liquid crystal layer comprising molecules 534 is sandwiched between substrates 530, 532. Surface features 536, 538 which may be for example prisms, may be positioned on the substrate 530 such that when used in combination with suitable alignment layers, vertical alignment of the molecules is achieved as shown. Alternatively, different polar (sometimes called zenithal) alignment in the domains can be produced by methods including (singly or in combination) different pre-tilt treatments or different protrusions, enabling different effective electric fields to be applied to the respective domains. Different fields may be applied to the domains by means including separate addressing, separate transistors or use of a floating electrode structure.

The director direction of the molecules varies in a manner such that the director directions 542, 544, 546 and 548 represent the alignment in different domains of one half of the individually addressable pixel, each comprising different alignments. Areas of black mask 540 are positioned so as to shield liquid crystal disclinations which would otherwise reduce display contrast. The domain shape is set by the structure of the black mask 540 but for convenience is referred to as the domain. The domain shape may also be determined by other layers such as by not limited to electrodes, capacitors and transistors. The optical properties of the domain are determined by the director alignments.

Figure 12A:
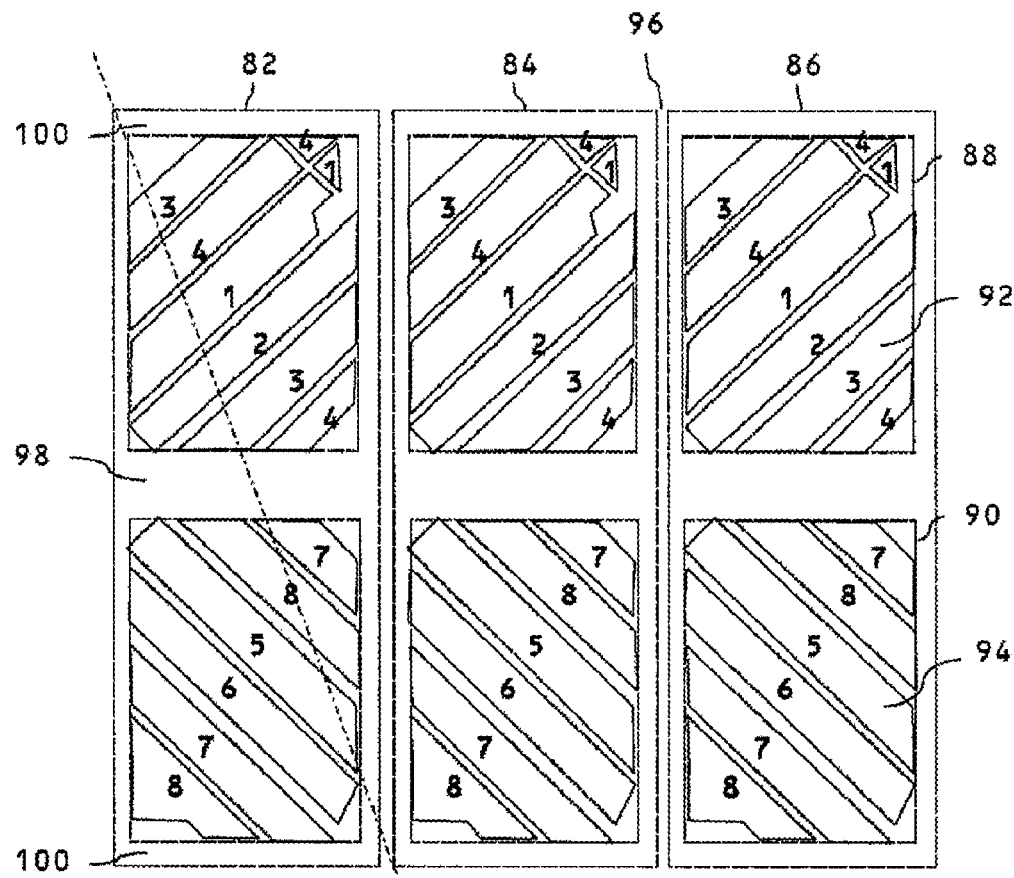
FIG. 12a shows a multi-domain pixel arrangement.
Figure 12B:
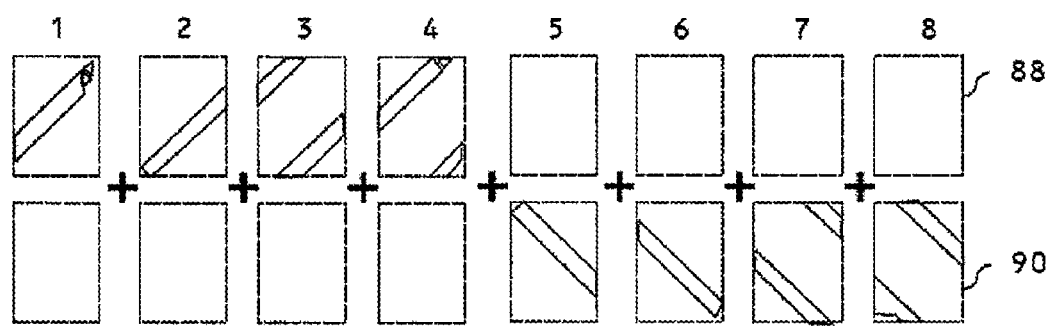
Figures 13A, 13B:
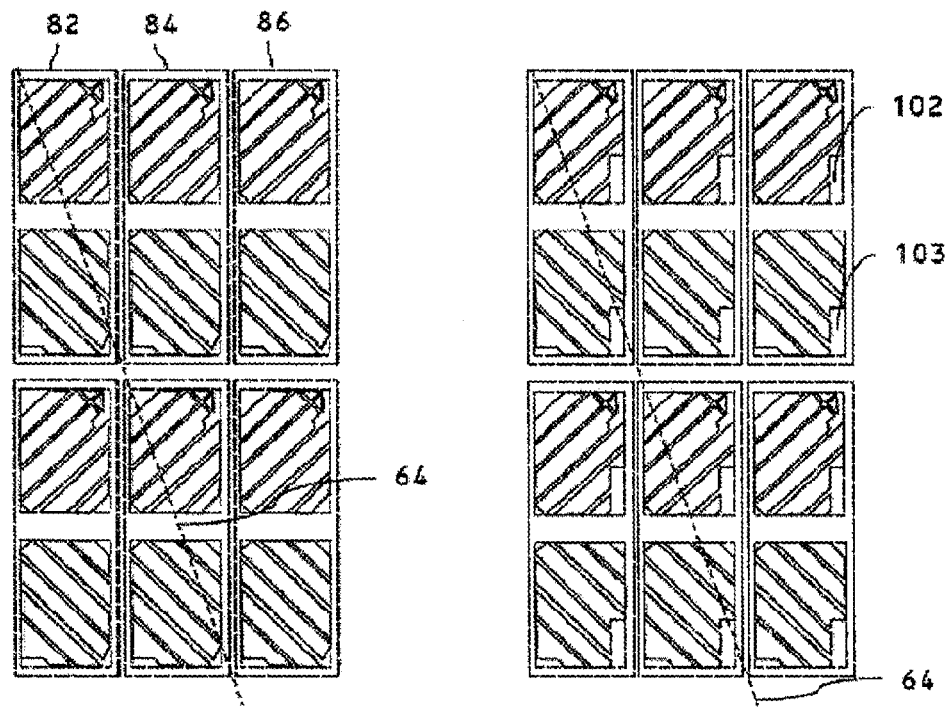
Figure 14:
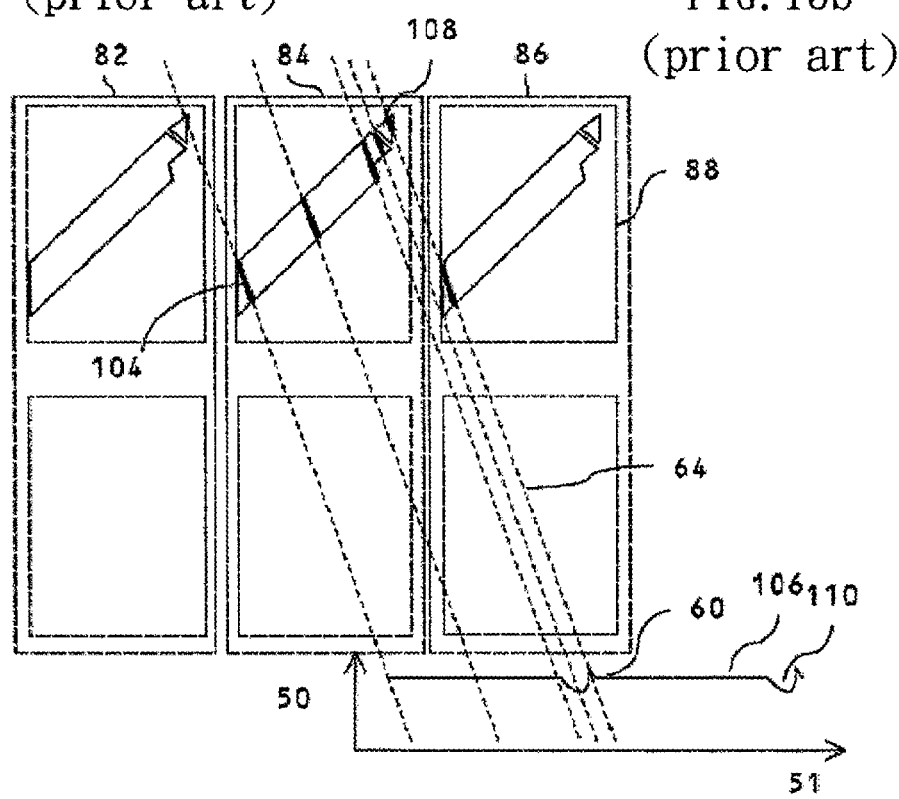
FIG. 14 shows the angular intensity distribution that results from a single domain.

The different director directions 542 and 546 for example may also be set by controlling the applied voltage to the different domains appropriately to achieve the similar polar alignment properties. The arrangement and area of the domains may be the same as in the example of FIG. 12a in order to achieve the required angular viewing properties, as described above.

Alternatively, the liquid crystal molecules may have some other liquid crystal arrangement such as for in-plane switching or fringe field switching in order to achieve the desired contrast uniformity. In this case, the features 536, 538 may be replaced by electrodes for example in order to achieve the required viewing angle characteristics.

Thus the liquid crystal material may be vertically aligned liquid crystal material or in-plane switching liquid crystal and the domains of the liquid crystal material have different alignments which in combination reduce the degree of contrast variation of a pixel with viewing angle.

Emissive displays typically have a Lambertian output so do not require multiple domains in order to achieve the contrast properties. However, such displays may be comprised of multiple individual domains so as to produce the required output by means of for example spatially multiplexing in which the grayscale output is determined by domain regions with different areas. In this case, the domains are of different sizes and the total output intensity from the pixel is determined by which domains are addressed. The present embodiments described below can thus be applied to achieve the correct grey scale uniformity with viewing angle in such spatially multiplexed displays.

The angle of the notional ray line with respect to the rows and columns of pixels may be determined by considering various desired properties of the 3D image for a given arrangement of color pixels. For example, with pixels in which the red, green and blue pixels are of equal size and together form a square color pixel unit cell with size 3 units horizontally and 3 units vertically, a ray line that is at an angle of 1 unit horizontally and 3 units vertically has an angle of 18.43 degrees to the vertical and provides windows which overlap to a first extent. Reducing the angle to 9.46 degrees by setting the ray line with an angle of 1 unit horizontally and 6 units vertically increases the overlap between adjacent windows (broadens the triangular window structure of FIG. 9). Broader windows will show increased view overlap so that undesirably pseudoscopic images are more likely to occur, as well as increasing the amount of blur in images. However, such an image will vary more smoothly as an observer moves laterally with respect to the display as well as having a greater vertical viewing freedom compared to the angle of 18.43 degrees. The two different angles also provide pixels with different spatial frequency information which can modify the fidelity of the 3D image. Alternative angles are also possible to modify the display properties as required.

In general, the ray lines (i.e. geometric axes of the optical elements) are inclined at an angle such that displacement of the geometric axes in the row direction by the pitch of the pixels in the row direction occurs within the pitch of the pixels in the column direction multiplied by a non-zero integer. For example, where the column direction is perpendicular to the row direction, this means that the geometric axes of the optical elements are inclined with respect to the column direction at an angle equal to $\arctan(pr/(pc \cdot n))$, where pr is the pitch of the pixels in the row direction, pc is the pitch of the pixels in the column direction, and n is a non-zero integer. The angles of 18.43 degrees and 9.46 degrees mentioned above correspond to the cases that n is 1 or 2, respectively.

In the embodiments of the present invention, modifying the angle of the ray line changes the overlap of the ray line with each domain as will be described in more detail.

Figure 15:
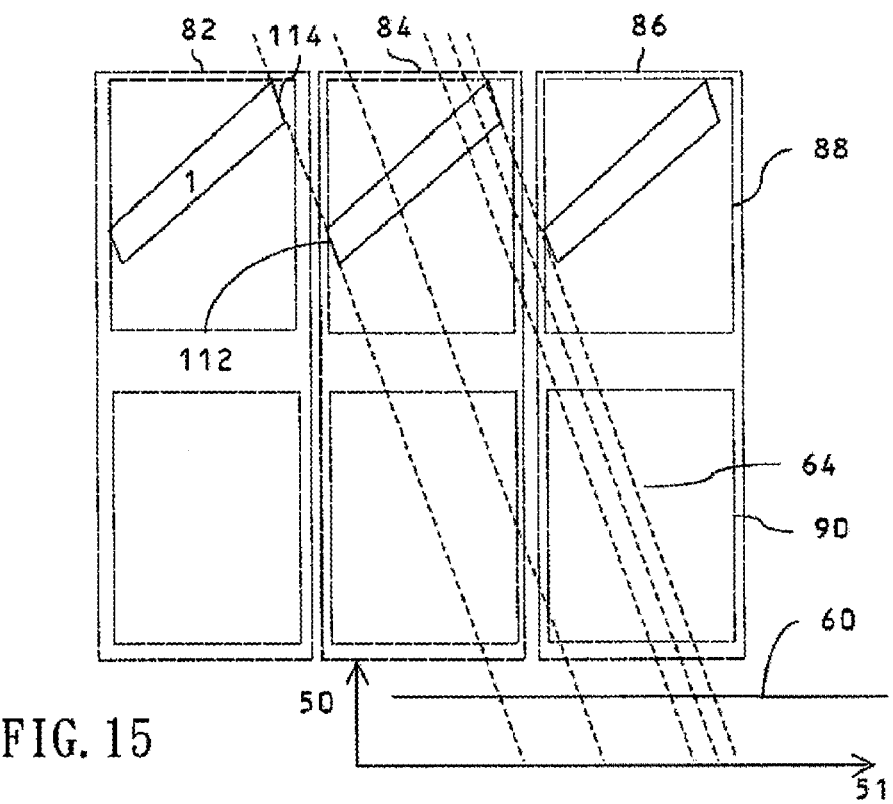
FIG. 15 shows a modified domain structure of an embodiment of the invention to provide a uniform angular intensity distribution.

FIG. 15 shows in plan view of a repeating unit of pixels 82, 84, 86 in a first embodiment which considers compensation of domain 1. The position of domain 1 within each pixel 82, 84, 86 is substantially the same for all pixels. The autostereoscopic optical element (not shown) such as a lenticular screen is aligned at an inclined angle to the pixel apertures so as to provide a multi-view autostereoscopic display as known. In this example, the pixels 82, 84, 86 are on a pitch of 1 unit horizontally and 3 vertically so that the color pixel in 2D mode has a pitch that is 3 units vertically and 3 units horizontally. The angle of inclination of the ray line, parallel to the geometric axis of the parallax optic is thus 1 unit horizontally and 3 units vertically, giving an angle of about 18.43 degrees to the vertical pixel axis. In order to provide high angular intensity uniformity from this domain, the intersection of the notional ray line 64 with the domain 1 is required to be constant for all positions of the ray line across the pixel width. In order to achieve this, the domain 1 has parallel sides extending at a non-zero angle $\theta_1$ to the ray lines 64. The domain also has end facets 112 and 114 which are parallel to the ray lines 64 and therefore also inclined with respect to the column direction. Such an arrangement relies on precise definition of the mask used to define the domain structure.

Figure 16A:
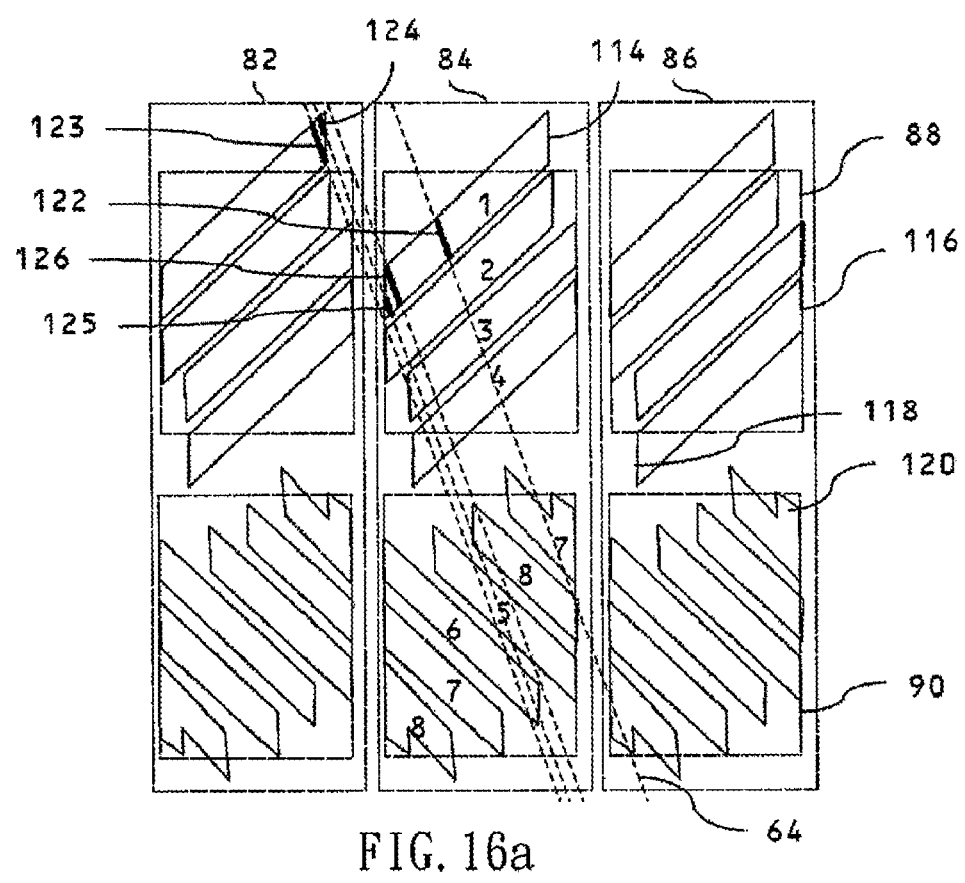
FIG. 16a shows a combination of modified domain structures embodiments of the invention to provide a uniform intensity and contrast distribution.

FIG. 16a shows a plan view of a repeating unit of individually addressable pixels 82, 84, 86 in which the end facets are modified to be non-parallel, that is at a non-zero angle, to the ray line 64, for example vertical as shown. In operation, a ray line 64 in the center of the pixel overlaps with intersection length 122. Either side of the facet, the intersection lengths 123, 126 are the same as the intersection length 122 while the ray line crosses the facet, the intersection lengths 124, 125 add to give the same total intersection length as the intersection length 122. Such a facet arrangement would advantageously be expected to have improved manufacturing tolerances, as errors in the manufacture, for example of the black mask layer will have a lesser influence on the total change in ray line length as the ray line crosses the boundary.

Note that the ray line is added from two adjacent pixels for illustrative simplicity. In general, the ray line will add from any number of adjacent pixels of the same color along the ray line length. Such pixels would not be expected to be adjacent in the array unless alternative color arrangements to the standard RGB stripe arrangement are used. Therefore, the total intensity is determined by different position pixels over the display surface. The size of the pixels in the 3D mode should be close or smaller than the resolution limit of the eye at the nominal viewing distance so that the overall intensity seen by the observer is averaged in the window plane and is not independently visible within the individual pixels.

FIG. 16a further shows one arrangement of all the domains 1-8, being a first group of domains 1-4 in a top sub-pixel 88 and a second group of domains 5-8 in a bottom sub-pixel 90. The end facets 114 are shown as vertical for reasons described above. In this arrangement, the shape of the domains 1-4 of the top sub-pixel 88 is identical, whereas the domains 5-8 of the bottom sub-pixel 90 have different shapes. For example, the domains 7 and 8 are extended vertically in size so as to maintain the total ray line overlap lengths constant.

Figure 16B:
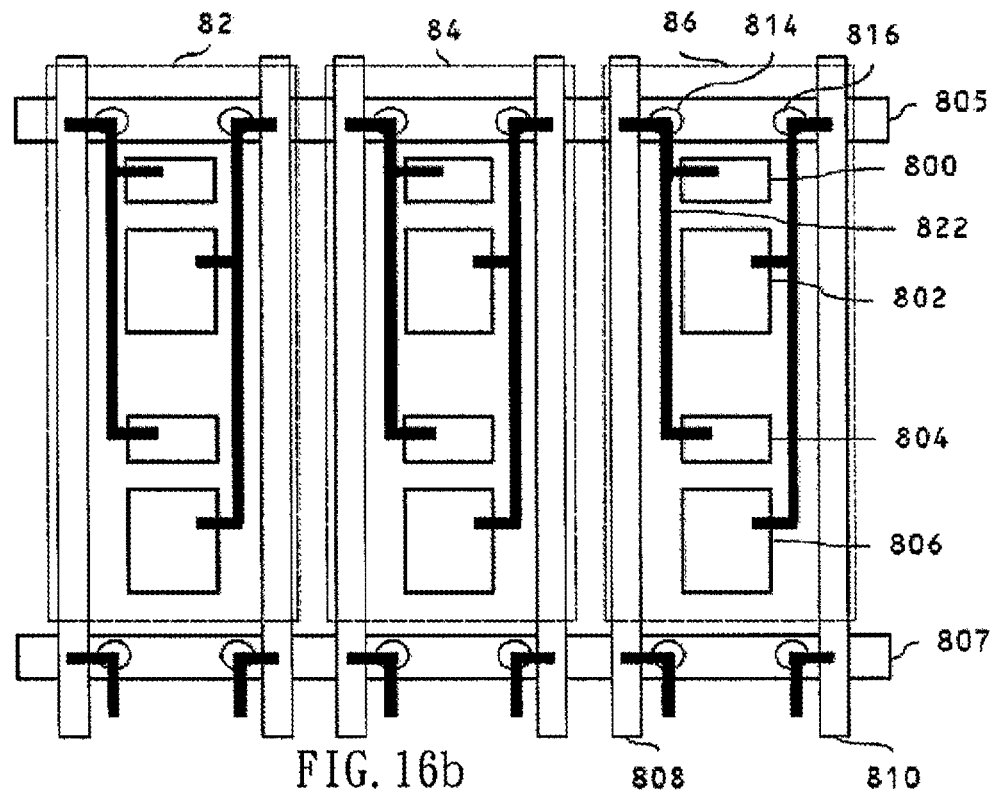
FIG. 16b shows schematically one addressing scheme for a pixel comprising multiple domains.

FIG. 16b shows an addressing scheme for the pixel arrangement of FIG. 16a known as "2 Data, 1 Gate", or 2D1G. The individually addressable pixels 82, 84, 86 each comprising multiple domains are shown schematically with addressing means. The main domain of the top sub-pixel of pixel 86 is represented by area 800 while the sub-domain of the top sub-pixel of pixel 86 is represented by area 802. Similarly the main domain of the bottom sub pixel of pixel 86 is represented by area 804 and the sub-domain of the bottom sub-pixel of pixel 86 is represented by area 806. Data electrodes (data lines) 808 and 810 provide data signals to the respective areas in cooperation with gate electrode (gate line) 805. Gate electrode (gate line) 807 is used to address the next row of pixels. Areas 800 and 804 (which may be pixel electrodes) are switched by addressing element 814 connected to the pixel areas by electrodes 822. Similarly areas 802 and 806 (which may be pixel electrodes) are switched by addressing element 816. The addressing elements 814, 816 may for example comprise thin film transistors. For example, the total area of the areas 800, 804 (main domains) is less than that of the areas 802, 806 (sub domains).

Two different data signals are applied to data electrodes (data lines) 808, 810 so that the main domain areas 800, 804 and sub-domain areas 802, 806 see slightly different signals. The signals are related to the desired pixel signal, but may provide different voltages in order to address the main and the sub domain with a different gamma curve (output greyscale transfer function). The pixel 86 is addressed with a 'target' grey scale related to the original data signal, and thus the pixel 86 can be treated as an individually addressable pixel comprising multiple domains, although the individual domain areas may be addressed with different grey scales so as to achieve grey scale uniformity over a wide viewing angle taking in to account any angular variation in the electro optic effect of the liquid crystal mode used.

Figure 16C:
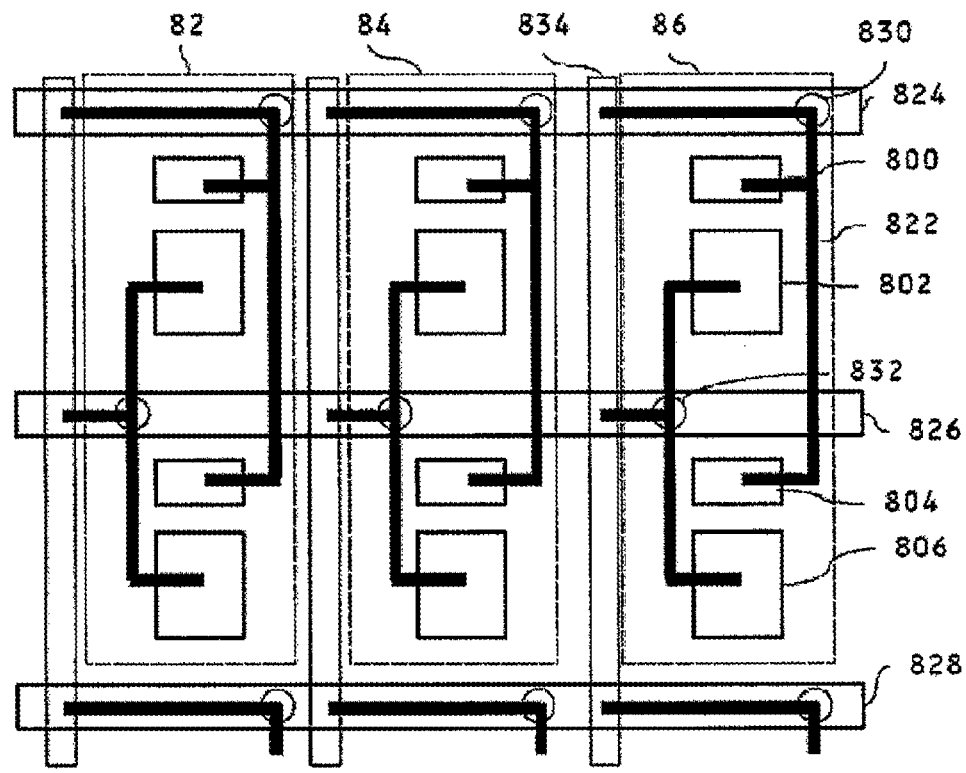
FIG. 16c shows schematically a further addressing scheme for a pixel comprising multiple domains.

FIG. 16c shows an addressing scheme for the pixel arrangement of FIG. 16a known as 2 Gate, 1 Data or 2G1D. Data electrode (data line) 834 provides data signals to the respective domain areas 800, 802, 804, 806 of pixel 86 in cooperation with gate electrodes (gate line) 824 and 826. Areas 800 and 804 are switched by addressing element 830 while areas 802 and 806 are switched by addressing element 832. Gate electrode (gate line) 828 is used to address the next row of pixels.

Within a single time slot, the data signal for the pixel 86 may take two different values and the two gate electrodes 824, 826 may be open for different pulse widths. Initially both main domains and sub domains are charged to a first data value and then the gate electrode 824 set to zero volts and the main domain transistor 830 is closed while a voltage is applied to gate electrode 826 and the transistor 832 remains open so that the areas 802, 806 are further charged to a second data value.

Thus the individually addressable pixel 86 comprises addressing circuitry capable of switching the main and sub-domains with different signals. Such an arrangement is used to control the grey scale response of each domain independently in order to optimize the angular grey scale response of the final pixel. The pixel 86 may be treated as an individually addressable pixel with multiple domains, as the addressing voltage of the individual domains is directly related to the required grey scale of the pixel and merely provides angular uniformity of output.

Alternatively, a single addressing element may be incorporated which addresses both top and bottom sub-pixels and is connected to a single data electrode and single gate electrode so that the individually addressable pixels comprise both top and bottom sub-pixels.

The spatial light modulator thus has an array of individually addressable pixels of different colors arranged with a repeating unit of pixels which repeats in a row direction and in a column direction, each pixel comprising plural domains.

Advantageously, the embodiments provide a uniform variation of intensity with viewing angle of the display. Such embodiments remove residual visibility of the black mask between the domains of the display. An observer looking at the display sees a uniform intensity structure across the display for a wide range of viewing angles. Thus, the display does not appear to flicker as the observer moves with respect to the display. Such flicker is a disturbing visual artefact. Further, the cost of the pixel arrangement is substantially the same as the known pixel arrangements. Thus, the AIU of the display as represented by the distribution 60 is advantageously substantially constant for all angles of viewing of the display, regardless of the focal condition of the parallax element. Such an arrangement advantageously also provides high ACU. Thus, the contrast of the display does not appear to change as the observer moves their head. If the contrast were to change as the observer moves, then the images would also appear to flicker, degrading display performance.

In switchable 2D/3D displays, there may also be some residual 3D function when the display is switched to 2D. Advantageously, in the present embodiments, the AIU and ACU are independent of the focal condition of the parallax optic. Thus, if there is some residual 3D function in the 2D mode, advantageously it will not be manifested as AIU or ACU effects in the present embodiments. This enables the manufacturing tolerances of the optical elements to be relaxed. For example, in switchable birefringent lenses, as described for example in U.S. Pat. No. 7,058,252, there may be some residual index step between a liquid crystal and isotropic lens material. In conventional pixels, this may cause an AIU error due to the residual lens function. In the present embodiments, the tolerance on index step can thus be relaxed, advantageously reducing lens cost and increasing yield.

In the present embodiments, the actual alignment of the individual domains can be adjusted to optimize aperture ratio while providing sufficient room for electrodes and addressing circuitry. The figures are provided for illustrative reasons, but could be adjusted. In each case, the intersection length is maintained across the domain width, and is constant for each domain.

Further, in the 3D mode, the focus of the lens can be optimized, rather than defocussed as reported in prior art systems. Advantageously this results in an increased separation of view data across adjacent viewing windows (as illustrated for example in FIG. 9). Reducing window overlap advantageously reduces the blur seen in 3D images so that the total amount of depth that can be shown is increased. Further, the pseudoscopic image intensity can be reduced, increasing display comfort. Such an arrangement can be applied to 3D displays using parallax optics such as lenticular screens and parallax barriers.

Further in lenses which have a variation in optical function with viewing angle such as caused by off-axis aberrations or by changes in the effective lens index step with incident illumination angle, the region of light collected from the pixel plane will vary with viewing angle. In the present embodiments, advantageously, the ray line has a constant intersection length for all ray lines for adjacent pixels of the same color along the ray line which means that as the region from which ray lines are collected varies with viewing angle, the same intensity and contrast function will be produced. Such a pixel arrangement therefore enables high viewing angle without the generation of non-uniform intensity distributions, giving good AIU and ACU properties.

Further, in passive birefringent lenses with function dependent on the viewing angle of a polarization switcher, the intensity variation will be independent on the polarization output of the switcher. Such an arrangement enables the switcher to have reduced optical compensation films, and so is cheaper, thinner and easier to manufacture.

Further in active birefringent lenses which have a 3D function off-axis when the lens is arranged in the 2D mode, the black mask is not resolved as a change in AIU or ACU with viewing angle.

Thus the present embodiments have advantages of increased image quality combined with reduced cost without compromising the 2D performance of the display. Such an arrangement is achieved by modification of layout of pixel apertures.

Figure 17:
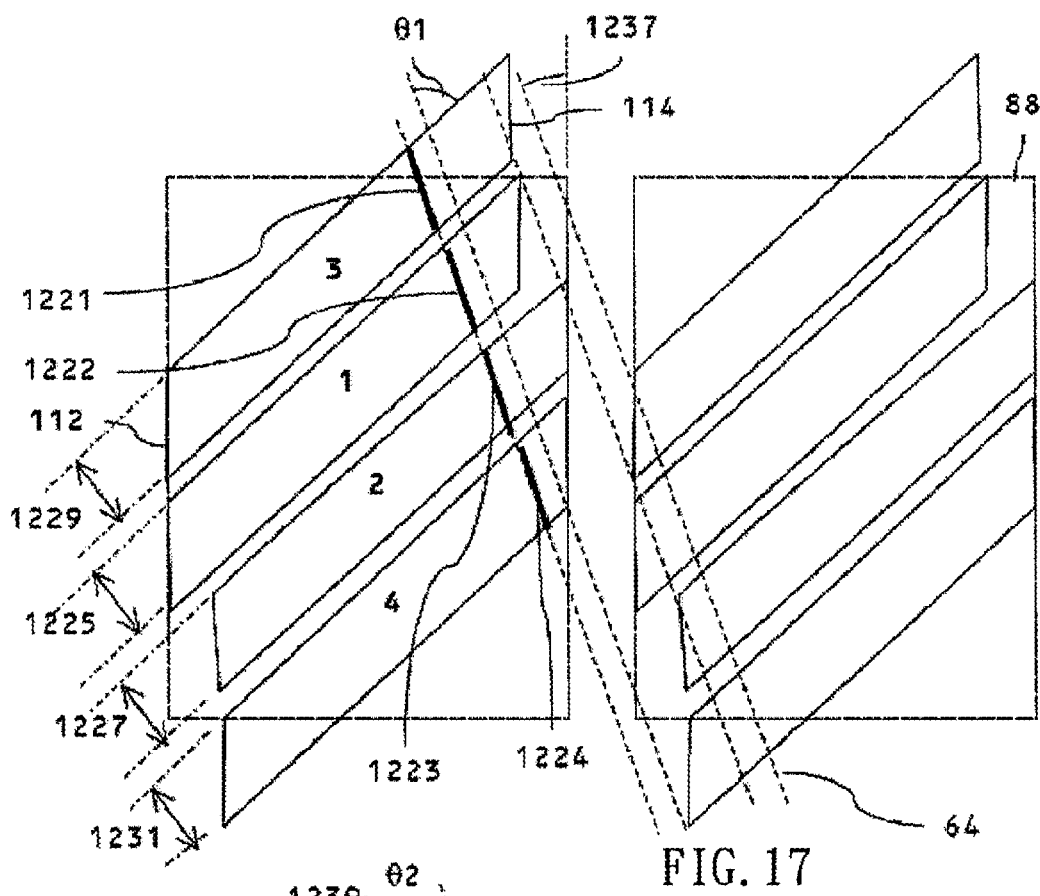

FIG. 17 shows the top sub-pixel 88 in more detail. The first group of domains 1-4 of the top sub-pixel 88 have parallel sides extending at a non-zero angle $\theta_1$ to the ray line 64 along the entire length of the domains 1-4, the domains 1-4 having respective widths 1225, 1227, 1229, 1231 perpendicularly between the parallel sides. Typically, the first group of domains 1-4 in the top sub-pixel 88 are aligned at +45 degrees to the vertical to advantageously give the optimum output contrast uniformity and to enable a vertically or horizontally oriented polarizer. The ray line 64 inclined at an angle 1237 with respect to the pixel columns intersects the domains 1, 2, 3, 4 with intersection lines 1222, 1223, 1221, 1224 respectively.

In a typical display, domains 1 and 2 are main domains having the same area in which case the intersection length of lines 1222 and 1223 is the same, and domains 3 and 4 are sub domains having the same area. The ratio of the area of a main domain to the area of a sub domain is termed as the domain area ratio and for example may be between 7:3 and 1:1, and typically 11:9. The intersection length of lines 1221 and 1224 is the same. The ratio of lengths 1222 and 1223 to lengths 1221 and 1224 is termed as the domain intersection length ratio and is the same as the upper pixel domain area ratio in conventional displays. Advantageously, such an arrangement will give substantially the same high-angle wash-out characteristics as a conventional display.

The ray lines have a total length of intersection with each of the domains 1-4 which is the same for all positions of the ray line, this length of intersection being summed over two domains of adjacent pixels in the same row in the case that the ray line overlaps an end facet 112 or 114.

Figure 18:
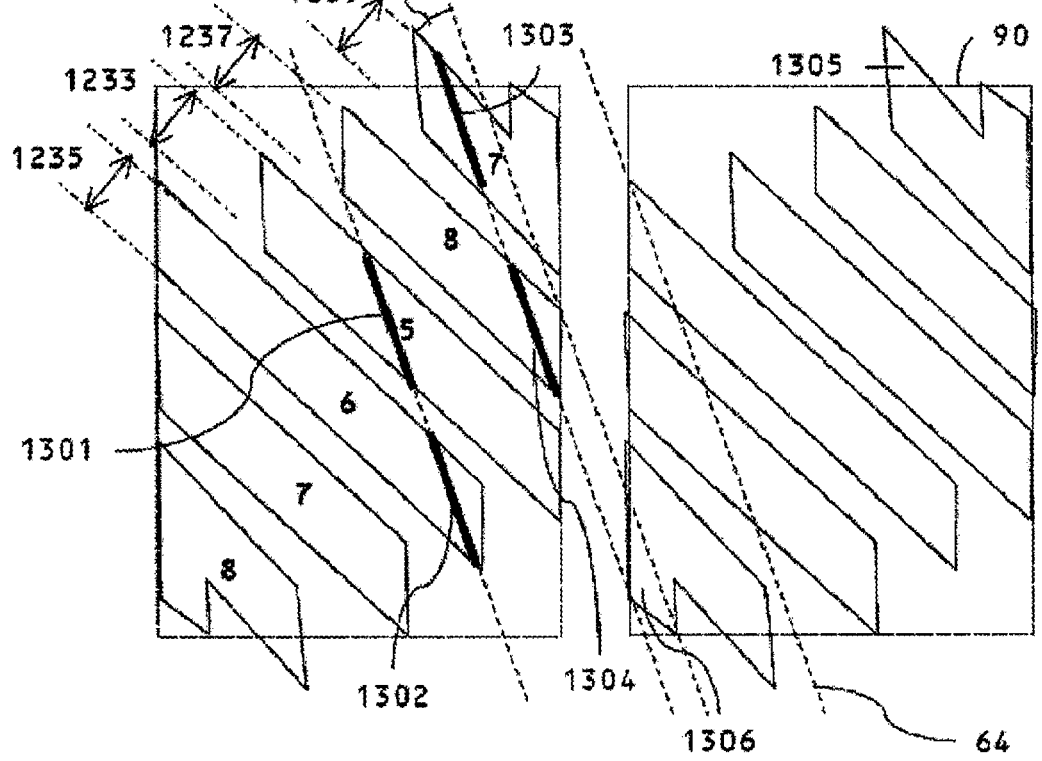

FIG. 18 shows a bottom sub-pixel 90 in more detail. The second group of domains 5-8 of the bottom sub-pixel 90 have parallel sides extending at a non-zero angle $\theta_2$ to the ray line 64 along the entire length of the domains 5 and 6 and along most of the domains 7 and 8, the domains 5-8 having respective widths 1233, 1235, 1237, 1239 perpendicularly between the parallel sides. Typically, the domains 5-8 are aligned at −45 degrees to the vertical to advantageously give the optimum output contrast uniformity and to enable a vertically or horizontally oriented polarizer. The ray line 64 intersects the domains 5, 6, 7, 8 with intersection lines 1301, 1302, 1303, 1304 respectively. Thus in this case the angle $\theta_2$ is different from the angle $\theta_1$.

Figure 20:
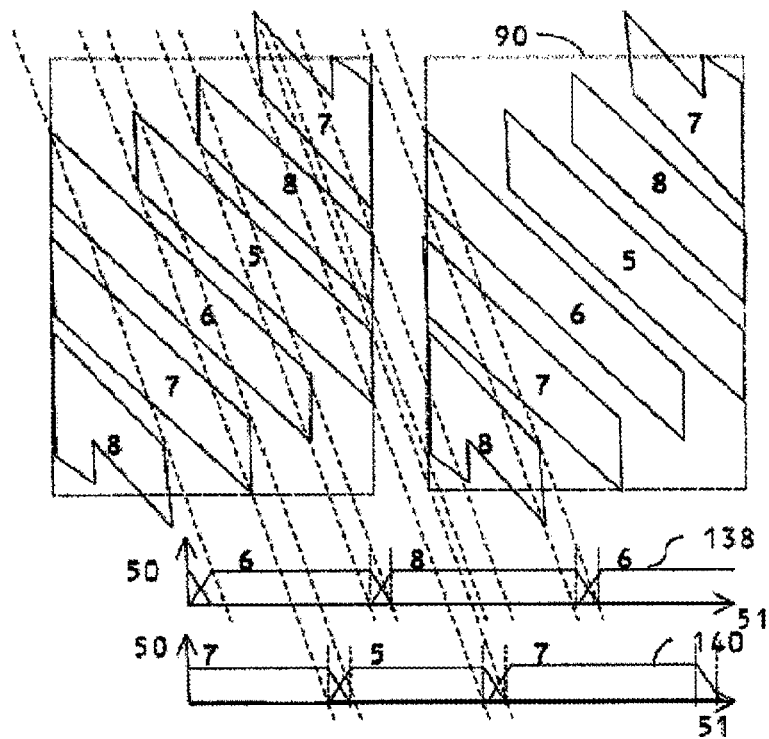
FIG. 20 shows the variation of domain output with ray line position for the bottom sub-pixel.

The second group of domains 5-8 of the bottom sub-pixel 90 also have a total length which when resolved perpendicular to the ray line 64 is equal to half the pitch of the cylindrical lenses, as discussed further below with reference to FIG. 20.

The domains 1-4 of the top sub-pixel 88 are arranged adjacent one another, as are the domains 5-8 of the bottom sub-pixel 90. This is not essential but has the advantage of allowing the pixels to be arranged compactly.

In a typical display, domains 5 and 6 are main domains having the same area as each other and as the main domains 1 and 2 of the first group of domains 1-4. In this case the intersection length of lines 1301 and 1302 is the same, and domains 7 and 8 are sub domains having the same area as each other and as the sub domains 3 and 4 of the first group of domains 1-4. In this case the intersection length of lines 1303 and 1304 is the same. The ratio of lengths 1301 and 1302 to lengths 1303 and 1304 is termed as the domain intersection length ratio and may be the same as the lower pixel domain area ratio in conventional displays. Advantageously, such an arrangement will give substantially the same wash-out characteristics as a conventional display. Note that the domains 7 and 8 which are sub domains may have additional regions 1305, 1306, within which the same intersection length of lines 1303, 1304 is preserved for all positions of the ray line within the domain.

Further, the total lengths of lines 1301 and 1302 will be substantially the same as the total length of lines 1221, 1222, 1223 and 1224. The total pixel domain intersection length ratio is the same as the domain area ratio in each case, so that the ratio of intersection of each domain to the total intersection length is the same as the ratio of area of each domain to the total domain area.

For illustrative purposes, if the domain area ratio is set as one, the widths of the domains in the top pixel will be set to be equal and the widths of the domains in the bottom pixel will be equal. If the top sub-pixel domain widths 1225, 1227, 1229 and 1231 is $w_t$, assuming a domain inclination of 45 degrees the total length it of the intersection lines 1222, 1223, 1221, 1224 of the ray line with the top sub-pixel domains 1, 2, 3, 4 is given by:

$$i_t = 4 \ast w_t / \sin(\theta_1)$$

As shown in FIG. 18 the second group of domains in the bottom sub-pixel 90 are aligned more closely parallel to the ray line. To compensate, the ray line intersects two domains at any one point, but the intersection length is greater. If the bottom sub-pixel nominal domain widths 1233, 1235, 1237, 1239 is $w_b$, assuming a domain inclination of −45 degrees the total length $i_b$ of the intersections 1301, 1302, 1303, 1304 of the ray line with the second group of domains 5, 6, 7, 8 in the bottom sub-pixel 90 is given by:

$$i_b = 2 \ast w_b / \sin(\theta_2)$$

In order to maintain equivalent intensity contributions from the each of the top and bottom sub-pixel domains, the total intersection lengths it and $i_b$ should be equal. In fact, in the case that the sides of the domains 1-4 are inclined with respect to the column direction by +45 degrees, the sides of the domains 5-8 are inclined with respect to the column direction by −45 degrees and the ray lines are inclined with respect to the column direction at an angle of 18.43 degrees, then the domain widths wt and wb are substantially the same. Advantageously, this allows the aperture ratio of the display to be optimized, as each domain can extend to cover the maximum area of the sub-pixel.

Figure 19:
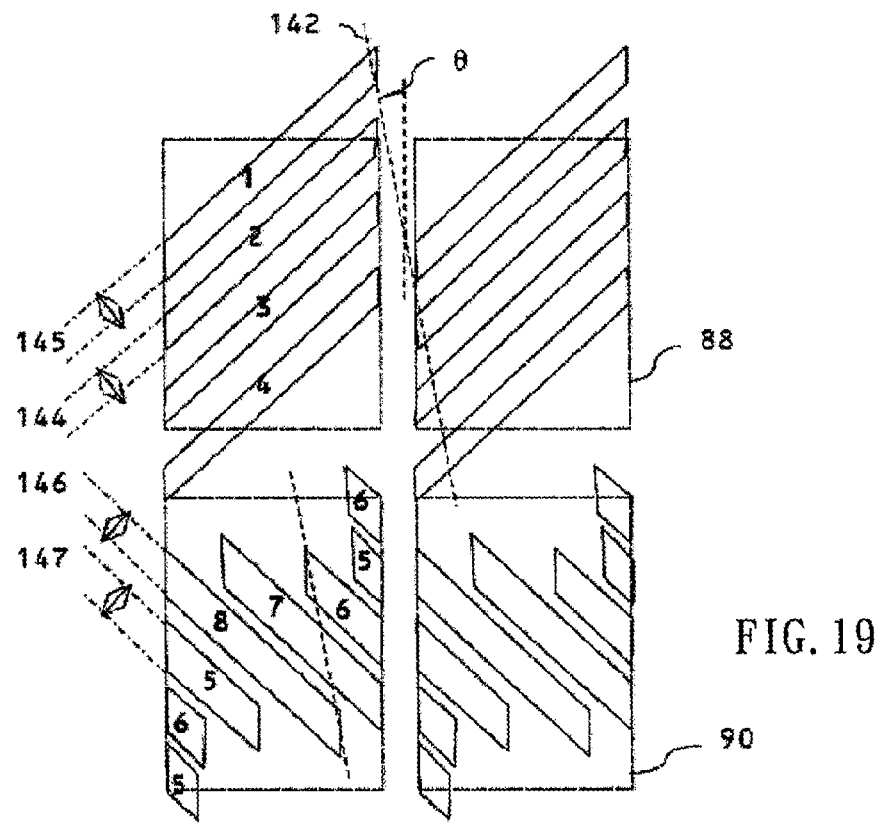

FIG. 19 shows one arrangement of pixel apertures in which the ray line 142 angle to the vertical θ is set for one unit horizontally and two units vertically, giving the angle of θ of 9.46 degrees, for example. This gives the relationship of:

$$w_t = 0.7 \ast w_b$$

Thus, for this particular angle, the top sub-pixel will have a reduced aperture ratio, while the total extent of the domain will be greater vertically in order to compensate the overall domain output efficiency. Such an arrangement also has increased overlap between adjacent windows.

Advantageously the ray line angle for θ of 18.43 degrees provides greater aperture ratio and reduced window overlap. If it is desirable to increase is window overlap in such a system (for example to reduce blur flicker effects in which the amount of blur varies with viewer position) then it is advantageously possible to defocus the lens accordingly. In the more vertical systems (i.e. having a smaller lens slant), it is not possible to reduce the window overlap.

Typically, the domain area ratio and thus the domain line intersection length ratios will not be one, so that the widths wt and wb will not be the same for the main domains 1, 2 and the sub domains 3, 4 in the first group of domains and for the main domains 5, 6 and the sub domains 7, 8 in the second group of domains. However, the line intersection length ratios will be the same as the area ratios for the respective domains, in particular when the bottom pixel domain compensation scheme described below is used.

Figure 30:
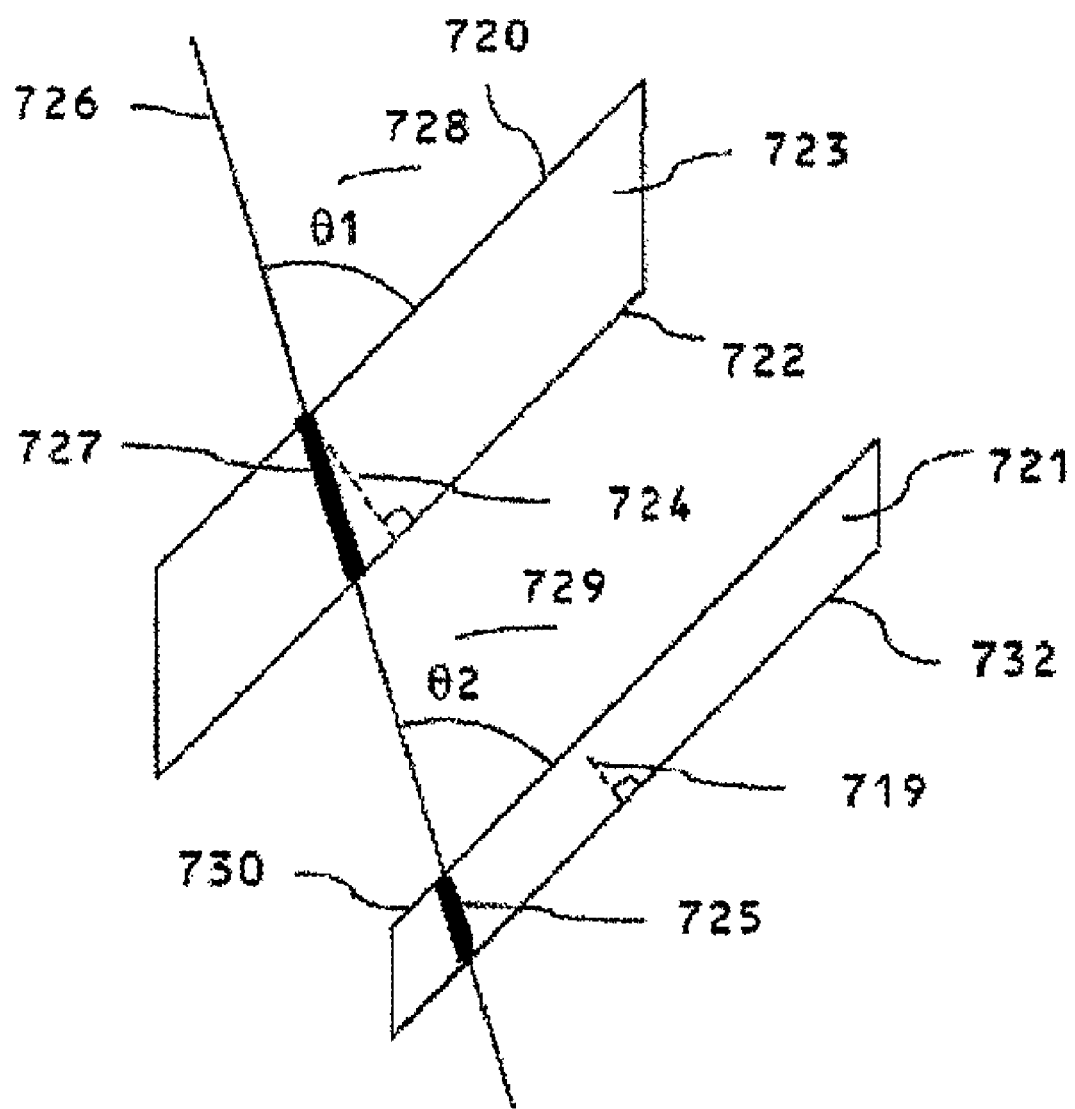
FIG. 30 shows the intersection of a ray line with two domains of a pixel.

The general case that the areas of the domains is not the same will now be considered with reference to FIG. 30 which shows two domains 723 and 721. The top domain 723 of area a1 with sides 720, 722 separated by width 724 of w1 is intersected by ray line 726 at an angle 728 of θ1 of less than 90 degrees. The length it of the intersection 727 of the ray line 726 with the top domain 723 is given by the expression w1/i1=sin θ1. Similarly, the bottom domain 721 of area a2 with sides 730, 732 separated by width 719 of w2 is intersected by ray line 726 at an angle 729 of θ2 less than 90 degrees such that the length i2 of the intersection 725 of the ray line 726 with the bottom domain 721 is given by the expression w2/i2=sin θ2. The ratio i1/i2 of the intersection lengths of the domains 723 and 721 is given by the ratio of the area a1 of the top domain 723 and a2 of the bottom domain 721 when summed across adjacent pixels along the ray line. Thus across adjacent pixels, w1/w2=a1·sin(θ1)/a2·sin(θ2). Note that within a single pixel, comprising first and second domains, the ratio may not hold as there may be no intersection of the ray line with at least one of the domains.

The ratio i1/i2 of the intersection lengths of the domains 723 and 721 is given by the ratio of the area a1 of the domain 723 and a2 of the domain 721 when summed across adjacent pixels along the ray line. Note that within a single pixel, comprising first and second domains, the ratio may not hold as there may be no intersection of the ray line with at least one of the domains.

As mentioned above, the second group of domains 5-8 of the bottom sub-pixel 90 have a total length when the resolved perpendicular to the ray line 64 is equal to half the pitch of the cylindrical lenses. As a result, for a single row of pixels, the ray lines 64 have a total length of intersection with the pair of domains 5 and 7 (and similarly with the pair of domains 6 and 8) which is the same for all positions of the ray line. This is shown in FIG. 20 which shows the domain overlap regions for the bottom sub-pixel 90. Distribution 138 shows the relative intensity provided by domains 6 and 8 for each position of the ray line, while distribution 140 shows the relative intensity provided by domains 5 and 7. While this arrangement provides uniform AIU, because the intersection length is constant across the pixel pitch, it may result in non-uniform ACU because the domains are not equally distributed with viewing angle 51.

Figure 21A:
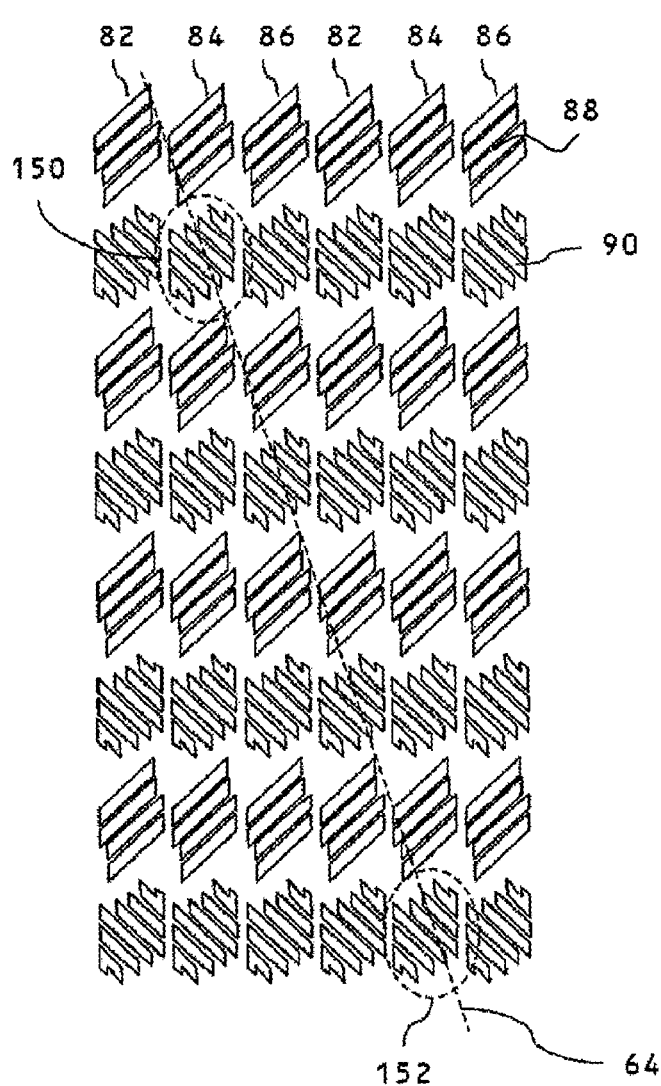
FIG. 21a shows a contrast compensation pixel arrangement.
Figure 22A:
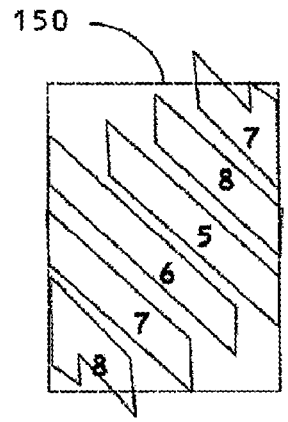
Figure 22B:
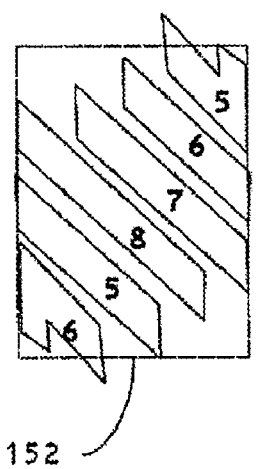

However, an ACU compensation arrangement for this effect is shown in FIG. 21a. The array of top sub-pixels 88 and bottom sub-pixels 90 is shown in FIG. 21a arranged in columns of red 82, green 84 and blue 86 pixels. In order to provide compensation of the ACU artefact shown in FIG. 20, adjacent bottom sub-pixels 150 and 152 along a ray line are arranged as shown in FIG. 22a and FIG. 22b. In particular, the pair of domains 5 and 7 (and similarly the pair of domains 6 and 8) have shapes which alternate in pixels of the same color which are adjacent along a ray line 64. Thus, in the bottom sub-pixel 150, the domains are arranged from bottom left to top right in the sequence 8, 7, 6, 5, 8, 7, and in the adjacent bottom sub-pixel 152 of the same color, the domains are arranged in the complementary sequence 6, 5, 8, 7, 6, 5. Thus, the summation over the two adjacent pixels 150 and 152 of the same color the total length of intersection with each domain 5-8 is the same for all positions of the ray line and so the final output ACU is uniform within a single view for the same color along the respective ray line. FIG. 21a also conveniently shows how the intensity match is achieved between adjacent domains on the same ray line of the same color, but can be illustrated between adjacent contiguous domains. Within one row of bottom sub-pixels 90, the domain sequence can be cycled between the two types, or may be constant within the row.

In FIG. 21a, upper bottom sub-pixel 150 and lower bottom sub-pixel 152 are adjacent sub-pixels of the same color along the ray line 64 in the meaning of the present invention. There may be more colors than red, green and blue per pixel, for example there may additionally be white pixels.

Figure 21B:
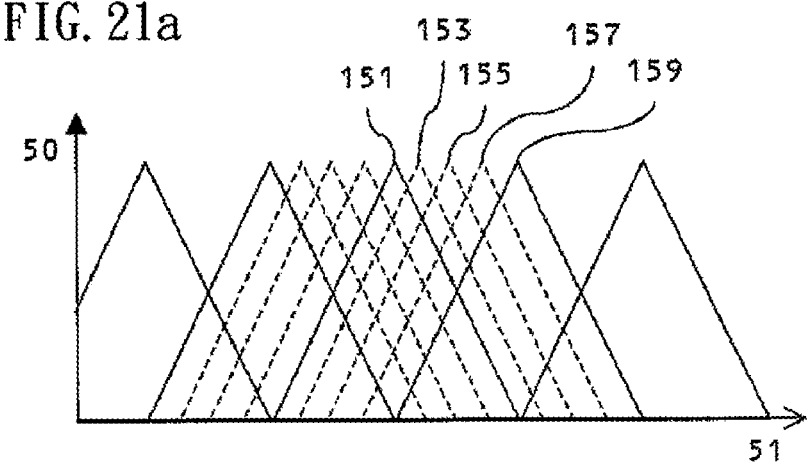
FIG. 21b shows schematically the window structure for individual domains.

FIG. 21b shows an alternative window structure that can be produced by the domain structures of the present invention in which the correction of FIG. 22 is not considered. Considering for example, the bottom sub-pixel domain structure of FIG. 18 when imaged by a parallax optical element, the individual domains may each be directed to a different respective position within the window plane. Thus the bottom sub-pixel may nominally be represented by an illumination profile 151, and further comprised of sub-structure comprising illumination profiles 153, 155, 157. The window structure then repeats with profile 159 for the adjacent pixel. Thus, as an observer's head moves across the window plane, the combination of domains that is seen may vary. If the individual addressable pixel 86 comprises multiple addressing elements, the individual domains may provide light at a different position in the window plane and may further be addressed so as to provide a grey scale more appropriate to the pixel intensity in that particular direction (position 51 in the window plane). Thus, the view data resolution of the display may be further increased. The data may be interpolated data from adjacent views. Thus the domain intensity may vary across the pixel width, dependent on the addressing voltage for adjacent pixels. Such an arrangement may advantageously increase the degree of smoothing of the image data as the observer moves their head, while reducing the degree of blur in the 3D image.

Figure 31:
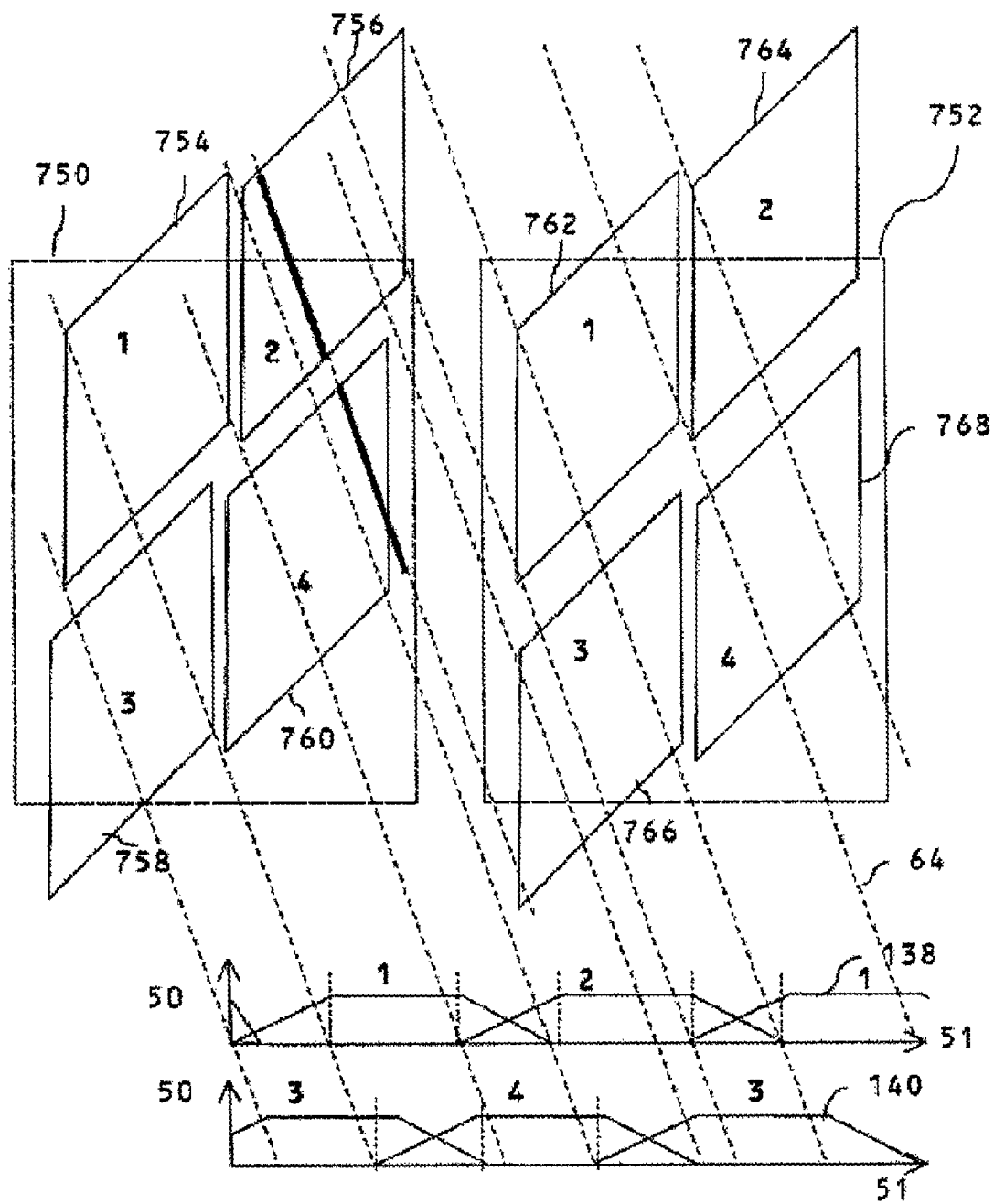
FIG. 31 shows a further modified domain structure of a top sub-pixel together with the variation of domain output with ray line position.

FIG. 31 shows an alternative embodiment of the top sub-pixel. A first top sub-pixel 750 has domains 1, 2, 3, 4 with boundaries 754, 756, 758, 760 respectively while the adjacent top sub-pixel 752 has domains 1, 2, 3, 4 with boundaries 762, 764, 766, 768 respectively. The window profiles for the respective domains are shown at bottom of the figure, showing that a smooth transition between domains 1 and 2 and domains 3 and 4.

Compared to the previous top sub-pixel embodiments, the intensity of any one domain is not constant for all positions of the notional ray line. In a similar manner to that shown in FIG. 21a, adjacent color pixels along the notional line 64 have domains which are reversed so that the total intensity from a domain is constant across adjacent pixels.

Figure 23:
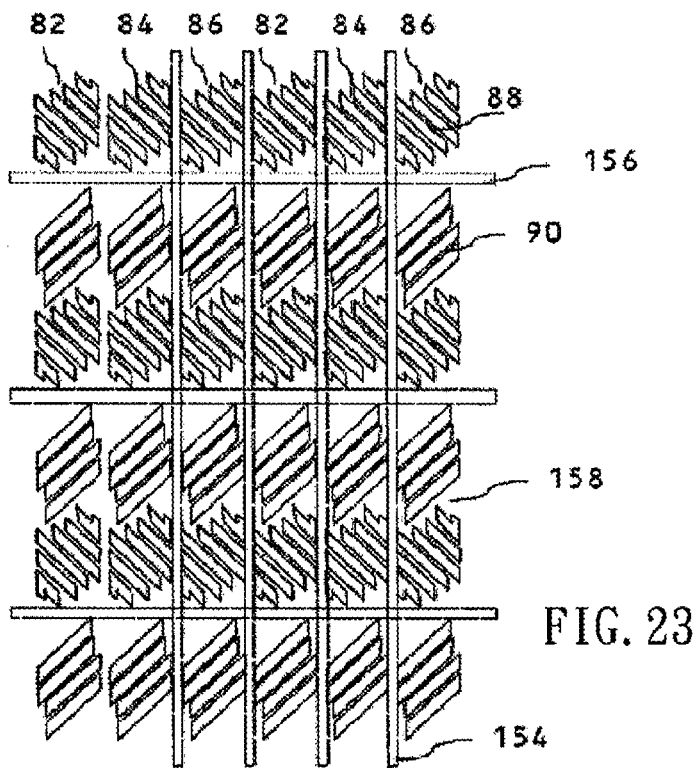
FIG. 23 shows a relative alignment of top and bottom sub-pixel apertures.

The arrangements shown have a uniform positioning of the sub-pixels 88 and 90. However, advantageously the sub-pixels 88 and 90 and the domains within the sub-pixels can be moved in position so as to optimize the arrangement for electrode and addressing circuitry placement. FIG. 23 shows the arrangement of FIG. 21a in which the bottom sub-pixels 90 have been shifted vertically. Column electrodes 154 and row electrodes 156 are conveniently inserted in the gaps between the apertures. Several areas, for example area 158, exist between the pixels in which other addressing circuitry can be positioned.

Figure 24:
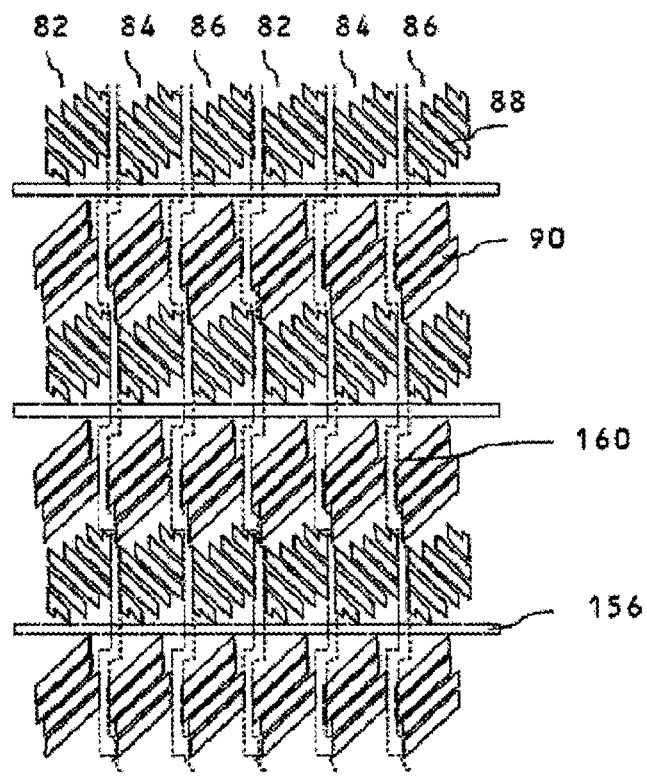
FIG. 24 shows a further relative alignment of top and bottom sub-pixel apertures.
Figure 25:
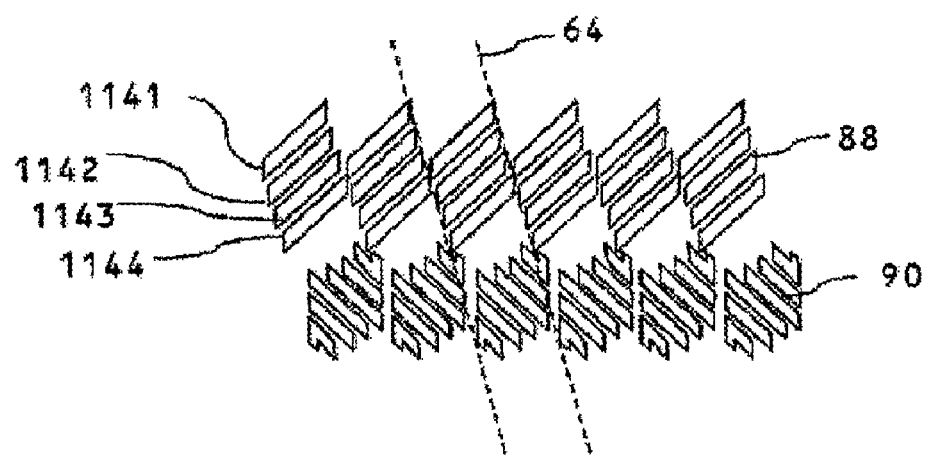
FIG. 25 shows a further relative alignment of top and bottom sub-pixel apertures.

In FIGS. 24 and 25, the bottom sub-pixel 90 has been shifted in the row direction so that the center of area of the second group of domains 5 to 8 of the bottom sub-pixel is offset along the row direction relative to the center of area of the first group of domains 1-4. This gives some staggering to the column electrode 160. Such an arrangement can advantageously be used to increase the free area available for addressing circuitry.

In the present embodiments, the individual domains can be shifted with respect to each other. This can advantageously be used to reduce the overlap between the view data as shown for example in FIG. 25 in which the center of area of the second group of domains 5 to 8 of the bottom sub-pixel and the center of area of the first group of domains 1-4 are aligned along a ray line 64. Thus, the domain facets 1141, 1142, 1143, 1144 have the same intersection point with the ray line. Such an arrangement can also be used to ensure that the view data remains with a constant ACU across an individual viewing window 36-41. Such an arrangement therefore further reduces the visibility of flicker artefacts while the observer moves while maximising image depth and reducing image blur between views. Alternatively, the domains can be shifted in the row direction so as to provide a greater window overlap and smooth blur flicker artefact, in which the amount of blur varies with viewer position so that in certain parts of the image, the intensity from a 3D pixel appears to fluctuate with viewer position.

Figure 26:
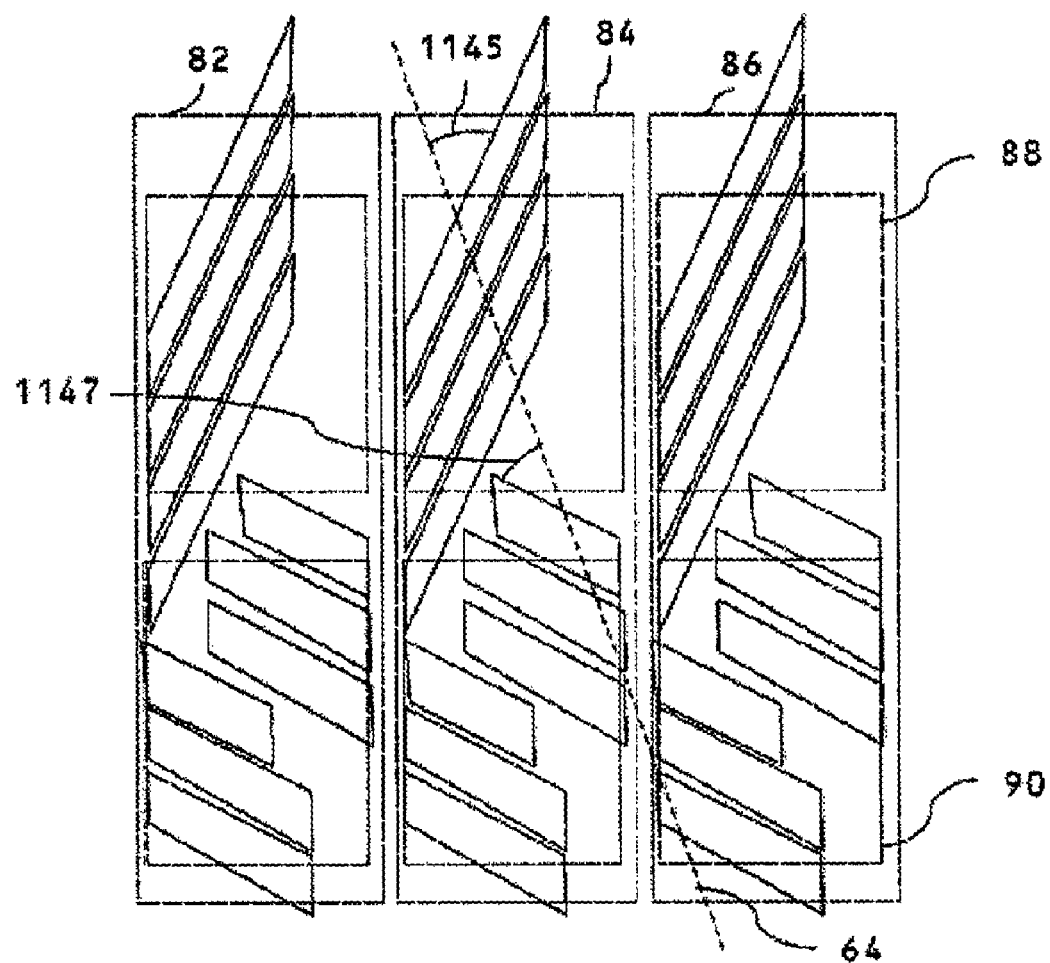
FIG. 26 shows a further pixel and domain arrangement.

FIG. 26 shows a further embodiment wherein the first group of domains in the top sub-pixel 88 and the second group of domains in the bottom sub-pixel 90 are adjusted to have respective angles of inclination 1145, 1147 (corresponding to angles θ1 and θ2) with respect to the ray line 64 which are of equal magnitude but of opposite sign. Such an arrangement may advantageously improve the layout of the bottom sub-pixel compared to the arrangement of domains in FIG. 17 and FIG. 18, providing greater aperture ratio in the bottom sub-pixel. Thus minor rotations of the optimum contrast cone and input polarization may be used to improve device performance in 2D and 3D modes, as well as reducing device costs.

Figure 27:
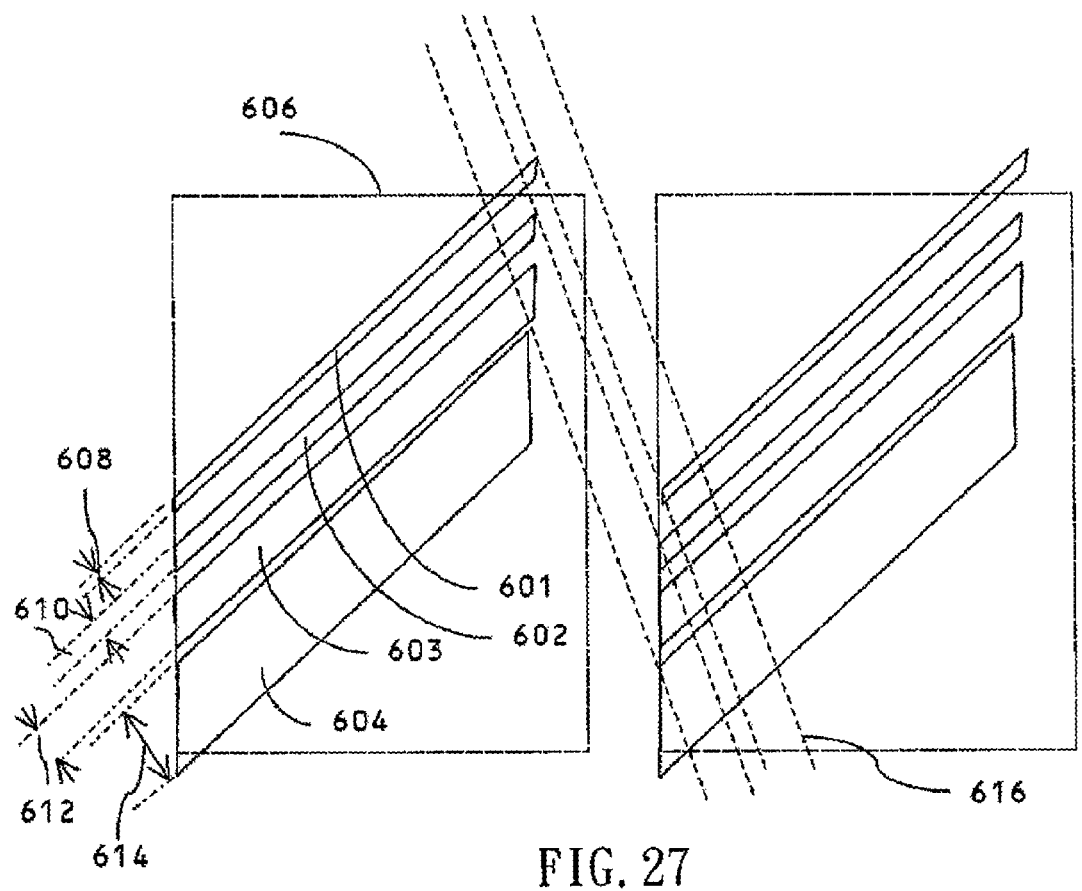
FIG. 27 shows a pixel arrangement for a spatially multiplexed spatial light modulator.

FIG. 27 shows a further embodiment of the invention in which the individual domains comprise parts of a spatially multiplexed pixel rather than a contrast multiplexed pixel described above. Such an arrangement can be applied to displays in which grey levels are achieved by means of controlling the proportion of the pixel that is transmitting, reflecting or emitting for example. The present invention advantageously ensures that the intensity of output is constant with viewing angle in such displays when used in combination with a parallax element such as a lenticular screen.

A pixel 606 comprising domains 601, 602, 603, 604 of different areas is aligned with a parallax element producing ray lines 616. The domains 601, 602, 603, 604 are arranged with widths 608, 610, 612 and 614 such that the length of intersection of the ray line 616 with each domain is proportional to the area of the domain and such that the total intersection length summed over adjacent pixels of the same color along the ray line 616 is the same for all positions of the ray line 616.

Figures 28, 29:
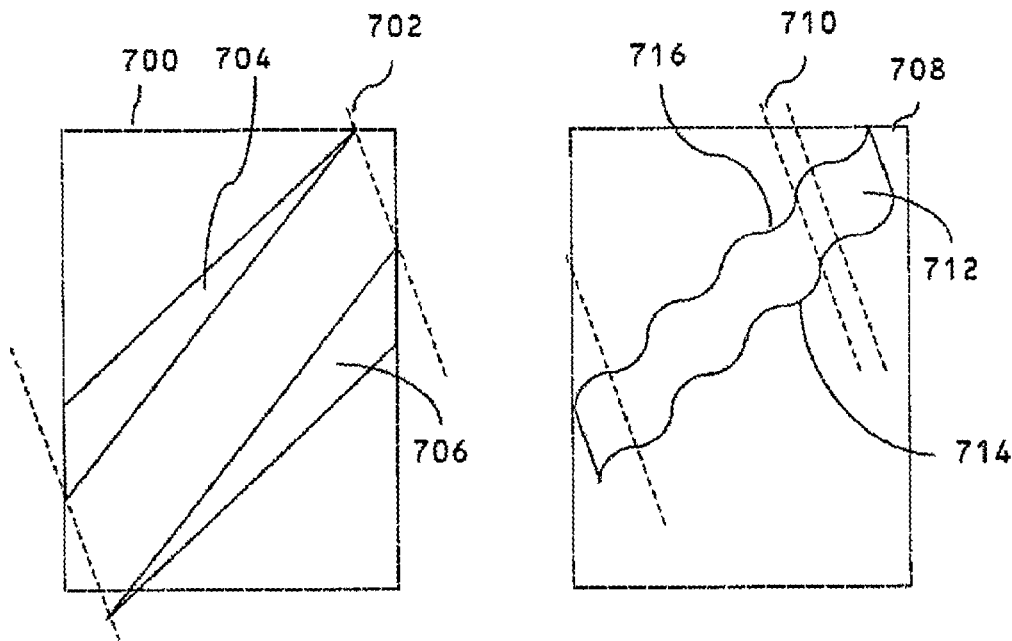
FIG. 28 shows an alternative domain shape in which the domain is sub-divided with non-parallel edges.
FIG. 29 shows a further domain shape with non-straight domain edges.

FIG. 28 shows an embodiment describing the structure of a sub-domain in which the sides of the sub-domain are non-parallel, for example a triangular aperture shape. The top sub-pixel 700 is shown with a single domain for clarity comprising sub-domains 704 and 706. The sub-domains are arranged such that the intersection length along a notional line 702 is substantially the same for the sub-domain for all positions of the line. The sub-domains can add together to produce a shape with parallel sides in order to obtain this result, while the individual sub-domains have non-parallel sides. Such an arrangement may advantageously enable the routing of electrodes through the domain area while maintaining the AIU and ACU characteristics of the display.

FIG. 29 shows an embodiment in which the sides of a domain are parallel but not straight. The top sub-pixel 708 may comprise a domain 712 with aperture edges 714, 716 that are not straight. The edges 714, 716 have many curves, for example. The edges 714, 716 are aligned with respect to each other such that the intersection length of a notional line 710 is constant for all positions of the notional line 710. Non-straight features may arise from detailed structure of the pixel layout for example to enable electronic structure layout. Further, such an arrangement may also provide improved diffraction characteristics in rear parallax barrier displays.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. An autostereoscopic display apparatus comprising:
    a spatial light modulator including an array of pixels arranged with a repeating unit of pixels, each pixel having plural domains; and
    a parallax element including an array of optical elements arranged over the spatial light modulator to direct light from pixels into different viewing windows, the optical elements having geometric axes in parallel with each other and across the spatial light modulator in a direction inclined at an angle with respect to a column direction,
    wherein the domains are shaped such that, for each individual domain, a notional line parallel to the geometric axes of the optical elements has a total length of intersection with the individual domain, summed over pixels of a same color which are along the notional line, and wherein said total length is the same for all positions of the notional line, said total length of intersection for different domains being proportional to the area of the individual domains.

2. An autostereoscopic display apparatus according to claim 1, wherein the domains include at least one domain having parallel sides extending, along at least a portion of the at least one domain, at a first non-zero angle with respect to the geometric axes.

3. An autostereoscopic display apparatus according to claim 2, wherein said at least one domain has end facets extending between said two parallel sides also at a second non-zero angle to the geometric axes.

4. An autostereoscopic display apparatus according to claim 1, wherein the domains include:
    a first group of domains having parallel sides extending along at least a portion of the first group of domains at a first angle θ1 to the geometric axes; and
    a second group of domains having parallel sides extending along at least a portion of the second group of domains at a second angle θ2 to the geometric axes, wherein one of the first group of domains has the same area as that of one of the second group of domains.

5. An autostereoscopic display apparatus according to claim 4, wherein
    the first group of domains includes domains of different areas, the ratios of distance between the two parallel sides of the respective domains of the first group being proportional to the ratios of the areas of the respective domains, and
    the second group of domains includes domains of different areas, the ratios of distance between the two parallel sides of the respective domains of the second group being proportional to the ratios of the areas of the respective domains.

6. An autostereoscopic display apparatus according to claim 5, wherein:
    the first group of domains include:
    main domains having the same area; and
    sub domains having the same area, wherein the area of the main domains is less than the area of the sub domains; and
    the second group of domains include:
    main domains having the same area as the main domains of the first group of domains; and
    sub domains having the same area as the sub domains of the first group of domains.

7. An autostereoscopic display apparatus according to claim 6, wherein the ratio of the area of the main domains to the sub domains is in the range from 7:3 to 1:1.

8. An autostereoscopic display apparatus according to claim 4, wherein
    the second angle θ2 is different from the first angle θ1.

9. An autostereoscopic display apparatus according to claim 4, wherein the first angle θ1 and the second angle θ2 are of equal magnitude but opposite sign.

10. An autostereoscopic display apparatus according to claim 4, wherein the domains of the first group are arranged adjacent each other and the domains of the second group are arranged adjacent each other.

11. An autostereoscopic display apparatus according to claim 10, wherein the center of area of the first group of domains and the center of area of the second group of domains are offset relative to each other along a row direction.

12. An autostereoscopic display apparatus according to claim 11, wherein the centers of area of the first group of domains and the second group of domains are aligned along said notional line parallel to the geometric axes of the optical elements of the parallax element.

13. An autostereoscopic display apparatus according to claim 1, wherein the domains include a pair of domains shaped such that, for a single row of pixels, said notional line parallel to the geometric axes of the optical elements of the parallax element has a total length of intersection with the pair of domains which is the same for all positions of the notional line, the pair of domains in pixels of the same color which are adjacent along the notional line having shapes which alternate so that said total length of intersection with an individual domain is the same for all positions of the notional line when summed over pixels of the same color which are adjacent along the notional line.

14. An autostereoscopic display apparatus according to claim 1, wherein the spatial light modulator is a liquid crystal spatial light modulator in which the domains are domains of liquid crystal material.

15. An autostereoscopic display apparatus according to claim 14, wherein the domains have different alignments which in combination reduce the degree of contrast variation of the pixels.

16. An autostereoscopic display apparatus according to claim 14, wherein the domains have different polar alignments, the liquid crystal material is vertically aligned liquid crystal material or in-plane switching liquid crystal material, the parallax element is a lenticular array, and the optical elements are cylindrical lenses.

17. An autostereoscopic display apparatus according to claim 1, wherein the geometric axes of the optical elements are inclined at an angle such that displacement of the geometric axes in a row direction by the pitch of the pixels in the row direction occurs within the pitch of the pixels in a column direction multiplied by a non-zero integer, and the column direction is perpendicular to the row direction.

18. An autostereoscopic display apparatus according to claim 1, wherein the geometric axes of the optical elements are inclined with respect to a column direction at an angle equal to $\arctan(pr/(pc \cdot n))$, where pr is the pitch of the pixels in the row direction, pc is the pitch of the pixels in the column direction, and n is a non-zero integer.

19. An autostereoscopic display apparatus according to claim 18, wherein the column direction of the repeating unit of pixels is in the vertical direction of the display apparatus and the geometric axes of the optical elements are inclined with respect to the vertical direction of the display apparatus.

20. An autostereoscopic display apparatus according to claim 19, wherein the column direction of the repeating unit of pixels is inclined with respect to the vertical direction of the display apparatus and the geometric axes of the optical elements extend in the vertical direction of the display apparatus.

* * * * *